US010427679B2

(12) United States Patent
Van Dan Elzen et al.

(10) Patent No.: US 10,427,679 B2
(45) Date of Patent: *Oct. 1, 2019

(54) LANE KEEPING SYSTEM AND LANE CENTERING SYSTEM

(71) Applicant: MAGNA ELECTRONICS INC., Auburn Hills, MI (US)

(72) Inventors: Christopher L. Van Dan Elzen, Rochester, MI (US); Ka Chai Cheok, Waterford, MI (US); Micho Radovnikovich, Shelby Township, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/700,272

(22) Filed: Sep. 11, 2017

(65) Prior Publication Data
US 2017/0369058 A1 Dec. 28, 2017

Related U.S. Application Data

(63) Continuation of application No. 14/935,700, filed on Nov. 9, 2015, now Pat. No. 9,758,163, which is a
(Continued)

(51) Int. Cl.
*B60W 30/12* (2006.01)
*B62D 6/00* (2006.01)
(Continued)

(52) U.S. Cl.
CPC ............ *B60W 30/12* (2013.01); *B60W 10/04* (2013.01); *B60W 10/20* (2013.01); *B60W 30/16* (2013.01);
(Continued)

(58) Field of Classification Search
CPC ...... B60W 50/14; B60W 50/16; B60W 10/04; B60W 10/20; B60W 2420/42;
(Continued)

(56) References Cited

U.S. PATENT DOCUMENTS

| 4,720,790 A | 1/1988 | Miki et al. |
| 4,987,357 A | 1/1991 | Masaki |

(Continued)

FOREIGN PATENT DOCUMENTS

DE 102004024692 12/2005

OTHER PUBLICATIONS

International Search Report and Written Opinion dated Mar. 2, 2012 for corresponding PCT Application No. PCT/US2011/061124.

*Primary Examiner* — Atul Trivedi
(74) *Attorney, Agent, or Firm* — Honigman LLP

(57) ABSTRACT

A lane centering system for use in a vehicle driving in a lane on a road includes a camera and a controller. Based on processing by a processor of image data captured by the camera, the controller determines the position of a left lane delimiter on the road on a left side of the vehicle and the position of a right lane delimiter on the road on a right side of the vehicle. The controller is operable to control a steering system of the vehicle that is configured to steer the vehicle. The controller is operable to determine a target path for the vehicle based on processing by the processor of image data captured by the camera. The determined target path maintains the longitudinal centerline of the vehicle centered between the left lane delimiter and the right lane delimiter.

26 Claims, 21 Drawing Sheets

Related U.S. Application Data continuation of application No. 13/884,752, filed as application No. PCT/US2011/061124 on Nov. 17, 2011, now Pat. No. 9,180,908.

(60) Provisional application No. 61/454,702, filed on Mar. 21, 2011, provisional application No. 61/415,409, filed on Nov. 19, 2010.

(51) Int. Cl.
*B60W 50/14* (2012.01)
*B60W 50/16* (2012.01)
*B62D 15/02* (2006.01)
*B60W 10/04* (2006.01)
*B60W 10/20* (2006.01)
*B60W 30/16* (2012.01)
*B60W 50/00* (2006.01)

(52) U.S. Cl.
CPC ............ *B60W 50/14* (2013.01); *B60W 50/16* (2013.01); *B62D 6/00* (2013.01); *B62D 15/025* (2013.01); *B60W 2050/0008* (2013.01); *B60W 2050/0037* (2013.01); *B60W 2050/0071* (2013.01); *B60W 2050/0073* (2013.01); *B60W 2420/42* (2013.01)

(58) Field of Classification Search
CPC ................. B60W 30/12; B60W 30/16; B60W 2050/0008; B60W 2050/0037; B60W 2050/0071; B60W 2050/0073; B62D 15/025; B62D 6/00
USPC .......................................................... 701/42
See application file for complete search history.

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |

(56) References Cited

U.S. PATENT DOCUMENTS

| | | | |
|---|---|---|---|
| 5,760,931 | A | 6/1998 | Saburi et al. |
| 5,760,962 | A | 6/1998 | Schofield et al. |
| 5,761,094 | A | 6/1998 | Olson et al. |
| 5,765,116 | A | 6/1998 | Wilson-Jones et al. |
| 5,765,118 | A | 6/1998 | Fukatani |
| 5,781,437 | A | 7/1998 | Wiemer et al. |
| 5,786,772 | A | 7/1998 | Schofield et al. |
| 5,790,403 | A | 8/1998 | Nakayama |
| 5,790,973 | A | 8/1998 | Blaker et al. |
| 5,793,308 | A | 8/1998 | Rosinski et al. |
| 5,793,420 | A | 8/1998 | Schmidt |
| 5,796,094 | A | 8/1998 | Schofield et al. |
| 5,835,255 | A | 11/1998 | Miles |
| 5,837,994 | A | 11/1998 | Stam et al. |
| 5,844,505 | A | 12/1998 | Van Ryzin |
| 5,844,682 | A | 12/1998 | Kiyomoto et al. |
| 5,845,000 | A | 12/1998 | Breed et al. |
| 5,848,802 | A | 12/1998 | Breed et al. |
| 5,850,176 | A | 12/1998 | Kinoshita et al. |
| 5,850,254 | A | 12/1998 | Takano et al. |
| 5,867,591 | A | 2/1999 | Onda |
| 5,877,707 | A | 3/1999 | Kowalick |
| 5,877,897 | A | 3/1999 | Schofield et al. |
| 5,878,357 | A | 3/1999 | Sivashankar et al. |
| 5,878,370 | A | 3/1999 | Olson |
| 5,883,739 | A | 3/1999 | Ashihara et al. |
| 5,884,212 | A | 3/1999 | Lion |
| 5,890,021 | A | 3/1999 | Onoda |
| 5,896,085 | A | 4/1999 | Mori et al. |
| 5,899,956 | A | 5/1999 | Chan |
| 5,915,800 | A | 6/1999 | Hiwatashi et al. |
| 5,923,027 | A | 7/1999 | Stam et al. |
| 5,924,212 | A | 7/1999 | Domanski |
| 5,929,786 | A | 7/1999 | Schofield et al. |
| 5,949,331 | A | 9/1999 | Schofield et al. |
| 5,959,555 | A | 9/1999 | Furuta |
| 5,963,247 | A | 10/1999 | Banitt |
| 5,986,796 | A | 11/1999 | Miles |
| 5,990,469 | A | 11/1999 | Bechtel et al. |
| 5,990,649 | A | 11/1999 | Nagao et al. |
| 6,020,704 | A | 2/2000 | Buschur |
| 6,049,171 | A | 4/2000 | Stam et al. |
| 6,066,933 | A | 5/2000 | Ponziana |
| 6,084,519 | A | 7/2000 | Coulling et al. |
| 6,097,023 | A | 8/2000 | Schofield et al. |
| 6,097,024 | A | 8/2000 | Stam et al. |
| 6,144,022 | A | 11/2000 | Tenenbaum et al. |
| 6,175,300 | B1 | 1/2001 | Kendrick |
| 6,178,034 | B1 | 1/2001 | Allemand et al. |
| 6,185,492 | B1 | 2/2001 | Kagawa et al. |
| 6,198,409 | B1 | 3/2001 | Schofield et al. |
| 6,222,447 | B1 | 4/2001 | Schofield et al. |
| 6,223,114 | B1 | 4/2001 | Boros et al. |
| 6,227,689 | B1 | 5/2001 | Miller |
| 6,250,148 | B1 | 6/2001 | Lynam |
| 6,266,082 | B1 | 7/2001 | Yonezawa et al. |
| 6,266,442 | B1 | 7/2001 | Laumeyer et al. |
| 6,285,393 | B1 | 9/2001 | Shimoura et al. |
| 6,294,989 | B1 | 9/2001 | Schofield et al. |
| 6,297,781 | B1 | 10/2001 | Turnbull et al. |
| 6,302,545 | B1 | 10/2001 | Schofield et al. |
| 6,310,611 | B1 | 10/2001 | Caldwell |
| 6,317,057 | B1 | 11/2001 | Lee |
| 6,320,176 | B1 | 11/2001 | Schofield et al. |
| 6,320,282 | B1 | 11/2001 | Caldwell |
| 6,333,759 | B1 | 12/2001 | Mazzilli |
| 6,341,523 | B2 | 1/2002 | Lynam |
| 6,353,392 | B1 | 3/2002 | Schofield et al. |
| 6,370,329 | B1 | 4/2002 | Teuchert |
| 6,392,315 | B1 | 5/2002 | Jones et al. |
| 6,396,397 | B1 | 5/2002 | Bos et al. |
| 6,420,975 | B1 | 7/2002 | DeLine et al. |
| 6,424,273 | B1 | 7/2002 | Gutta et al. |
| 6,430,303 | B1 | 8/2002 | Naoi et al. |
| 6,442,465 | B2 | 8/2002 | Breed et al. |
| 6,477,464 | B2 | 11/2002 | McCarthy et al. |
| 6,487,501 | B1 | 11/2002 | Jeon |
| 6,497,503 | B1 | 12/2002 | Dassanayake et al. |
| 6,498,620 | B2 | 12/2002 | Schofield et al. |
| 6,516,664 | B2 | 2/2003 | Lynam |
| 6,523,964 | B2 | 2/2003 | Schofield et al. |
| 6,539,306 | B2 | 3/2003 | Turnbull |
| 6,547,133 | B1 | 4/2003 | DeVries, Jr. et al. |
| 6,553,130 | B1 | 4/2003 | Lemelson et al. |
| 6,559,435 | B2 | 5/2003 | Schofield et al. |
| 6,574,033 | B1 | 6/2003 | Chui et al. |
| 6,589,625 | B1 | 7/2003 | Kothari et al. |
| 6,594,583 | B2 | 7/2003 | Ogura et al. |
| 6,611,202 | B2 | 8/2003 | Schofield et al. |
| 6,611,610 | B1 | 8/2003 | Stam et al. |
| 6,636,258 | B2 | 10/2003 | Strumolo |
| 6,650,455 | B2 | 11/2003 | Miles |
| 6,672,731 | B2 | 1/2004 | Schnell et al. |
| 6,674,562 | B1 | 1/2004 | Miles |
| 6,678,614 | B2 | 1/2004 | McCarthy et al. |
| 6,680,792 | B2 | 1/2004 | Miles |
| 6,690,268 | B2 | 2/2004 | Schofield et al. |
| 6,700,605 | B1 | 3/2004 | Toyoda et al. |
| 6,704,621 | B1 | 3/2004 | Stein et al. |
| 6,710,908 | B2 | 3/2004 | Miles et al. |
| 6,711,474 | B1 | 3/2004 | Treyz et al. |
| 6,714,331 | B2 | 3/2004 | Lewis et al. |
| 6,717,610 | B1 | 4/2004 | Bos et al. |
| 6,735,506 | B2 | 5/2004 | Breed et al. |
| 6,741,377 | B2 | 5/2004 | Miles |
| 6,744,353 | B2 | 6/2004 | Sjönell |
| 6,757,109 | B2 | 6/2004 | Bos |
| 6,762,867 | B2 | 7/2004 | Lippert et al. |
| 6,794,119 | B2 | 9/2004 | Miles |
| 6,795,221 | B1 | 9/2004 | Urey |
| 6,802,617 | B2 | 10/2004 | Schofield et al. |
| 6,806,452 | B2 | 10/2004 | Bos et al. |
| 6,819,231 | B2 | 11/2004 | Berberich et al. |
| 6,822,563 | B2 | 11/2004 | Bos et al. |
| 6,823,241 | B2 | 11/2004 | Shirato et al. |
| 6,824,281 | B2 | 11/2004 | Schofield et al. |
| 6,831,261 | B2 | 12/2004 | Schofield et al. |
| 6,882,287 | B2 | 4/2005 | Schofield |
| 6,889,161 | B2 | 5/2005 | Winner et al. |
| 6,891,563 | B2 | 5/2005 | Schofield et al. |
| 6,909,753 | B2 | 6/2005 | Meehan et al. |
| 6,946,978 | B2 | 9/2005 | Schofield |
| 6,953,253 | B2 | 10/2005 | Schofield et al. |
| 6,968,736 | B2 | 11/2005 | Lynam |
| 6,975,775 | B2 | 12/2005 | Rykowski et al. |
| 6,989,736 | B2 | 1/2006 | Berberich et al. |
| 7,004,606 | B2 | 2/2006 | Schofield |
| 7,005,974 | B2 | 2/2006 | McMahon et al. |
| 7,038,577 | B2 | 5/2006 | Pawlicki et al. |
| 7,062,300 | B1 | 6/2006 | Kim |
| 7,065,432 | B2 | 6/2006 | Moisel et al. |
| 7,079,017 | B2 | 7/2006 | Lang et al. |
| 7,085,637 | B2 | 8/2006 | Breed et al. |
| 7,092,548 | B2 | 8/2006 | Laumeyer et al. |
| 7,111,968 | B2 | 9/2006 | Bauer et al. |
| 7,116,246 | B2 | 10/2006 | Winter et al. |
| 7,123,168 | B2 | 10/2006 | Schofield |
| 7,145,519 | B2 | 12/2006 | Takahashi et al. |
| 7,149,613 | B2 | 12/2006 | Stam et al. |
| 7,161,616 | B1 | 1/2007 | Okamoto et al. |
| 7,167,796 | B2 | 1/2007 | Taylor et al. |
| 7,195,381 | B2 | 3/2007 | Lynam et al. |
| 7,202,776 | B2 | 4/2007 | Breed |
| 7,205,904 | B2 | 4/2007 | Schofield |
| 7,227,459 | B2 | 6/2007 | Bos et al. |
| 7,227,611 | B2 | 6/2007 | Hull et al. |
| 7,311,406 | B2 | 12/2007 | Schofield et al. |
| 7,325,934 | B2 | 2/2008 | Schofield et al. |
| 7,325,935 | B2 | 2/2008 | Schofield et al. |
| 7,338,177 | B2 | 3/2008 | Lynam |
| 7,339,149 | B1 | 3/2008 | Schofield et al. |
| 7,344,261 | B2 | 3/2008 | Schofield et al. |
| 7,355,524 | B2 | 4/2008 | Schofield |
| 7,355,526 | B2 | 4/2008 | Huang |

(56) References Cited

U.S. PATENT DOCUMENTS

| | | | |
|---|---|---|---|
| 7,370,983 B2 | 5/2008 | De Wind et al. |
| 7,380,948 B2 | 6/2008 | Schofield et al. |
| 7,388,182 B2 | 6/2008 | Schofield et al. |
| 7,400,236 B2 | 7/2008 | Kade et al. |
| 7,402,786 B2 | 7/2008 | Schofield et al. |
| 7,423,248 B2 | 9/2008 | Schofield et al. |
| 7,424,364 B2 | 9/2008 | Gern et al. |
| 7,425,076 B2 | 9/2008 | Schofield et al. |
| 7,446,650 B2 | 11/2008 | Schofield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,510,038 B2 | 3/2009 | Kauffmann et al. |
| 7,526,103 B2 | 4/2009 | Schofield et al. |
| 7,532,981 B2 | 5/2009 | Kataoka |
| 7,561,032 B2 | 7/2009 | Huang et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,711,464 B2 | 5/2010 | Kaufmann |
| 7,720,580 B2 | 5/2010 | Higgins-Luthman |
| 7,777,611 B2 | 8/2010 | Desai |
| 7,881,496 B2 | 2/2011 | Camilleri et al. |
| 7,885,730 B2 | 2/2011 | Kauffmann et al. |
| 7,914,187 B2 | 3/2011 | Higgins-Luthman et al. |
| 7,965,336 B2 | 6/2011 | Bingle et al. |
| 8,027,029 B2 | 9/2011 | Lu et al. |
| 8,058,977 B2 | 11/2011 | Lynam |
| 8,164,628 B2 | 4/2012 | Stein |
| 8,593,521 B2 * | 11/2013 | Schofield ........... G06K 9/00818 |
| | | | 348/148 |
| 8,670,903 B2 | 3/2014 | Lee et al. |
| 8,694,224 B2 | 4/2014 | Chundrlik, Jr. et al. |
| 8,818,606 B2 | 8/2014 | Lee et al. |
| 8,917,169 B2 * | 12/2014 | Schofield ............... B60N 2/002 |
| | | | 340/425.5 |
| 8,930,081 B2 | 1/2015 | Bolourchi |
| 8,965,633 B2 | 2/2015 | Lee et al. |
| 9,047,518 B2 * | 6/2015 | Nunn ................. G06K 9/00798 |
| 9,081,385 B1 * | 7/2015 | Ferguson ........... G06K 9/00798 |
| 9,120,486 B1 | 9/2015 | Mallinger |
| 9,180,908 B2 | 11/2015 | Van Dan Elzen et al. |
| 9,436,880 B2 * | 9/2016 | Bos ........................ B60N 2/002 |
| 9,555,803 B2 * | 1/2017 | Pawlicki ............... B60W 30/18 |
| 9,736,435 B2 * | 8/2017 | Schofield ........... G06K 9/00818 |
| 9,758,163 B2 | 9/2017 | Van Dan Elzen et al. |
| 9,779,313 B2 * | 10/2017 | Pliefke ..................... B60R 1/00 |
| 9,911,050 B2 * | 3/2018 | Lynam .................. B60Q 9/005 |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0025597 A1 | 2/2003 | Schofield |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0098197 A1 | 5/2004 | Matsumoto |
| 2004/0107035 A1 | 6/2004 | Tange |
| 2004/0114381 A1 | 6/2004 | Salmeen et al. |
| 2004/0128065 A1 | 7/2004 | Taylor et al. |
| 2004/0183663 A1 | 9/2004 | Shimakage |
| 2004/0200948 A1 | 10/2004 | Bos et al. |
| 2004/0230375 A1 | 11/2004 | Matsumoto |
| 2004/0252020 A1 | 12/2004 | Matsumoto |
| 2005/0015203 A1 | 1/2005 | Nishira |
| 2005/0078389 A1 | 4/2005 | Kulas et al. |
| 2005/0107931 A1 | 5/2005 | Shimakage |
| 2005/0125153 A1 | 6/2005 | Matsumoto |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0179527 A1 | 8/2005 | Schofield |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2007/0023613 A1 | 2/2007 | Schofield et al. |
| 2007/0091173 A1 | 4/2007 | Kade et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2008/0061952 A1 | 3/2008 | Maass |
| 2008/0091318 A1 | 4/2008 | Deng et al. |
| 2008/0180529 A1 | 7/2008 | Taylor et al. |
| 2008/0183342 A1 | 7/2008 | Kaufmann et al. |
| 2009/0088966 A1 * | 4/2009 | Yokoyama ........... B62D 15/025 |
| | | | 701/533 |
| 2009/0113509 A1 | 4/2009 | Tseng et al. |
| 2009/0132125 A1 | 5/2009 | Yonezawa |
| 2009/0234553 A1 | 9/2009 | Sekiguchi |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2009/0299573 A1 | 12/2009 | Thrun et al. |
| 2010/0020170 A1 | 1/2010 | Higgins-Luthman et al. |
| 2010/0045797 A1 | 2/2010 | Schofield et al. |
| 2010/0082195 A1 | 4/2010 | Lee et al. |
| 2010/0097469 A1 | 4/2010 | Blank et al. |
| 2010/0114431 A1 | 5/2010 | Switkes |
| 2010/0121532 A1 | 5/2010 | Urai |
| 2010/0201896 A1 * | 8/2010 | Ostreko ..................... B60R 1/12 |
| | | | 349/1 |
| 2010/0228420 A1 | 9/2010 | Lee |
| 2010/0228437 A1 | 9/2010 | Hanzawa et al. |
| 2010/0231718 A1 | 9/2010 | Nakamori et al. |
| 2010/0295668 A1 | 11/2010 | Kataoka |
| 2011/0231095 A1 | 9/2011 | Nakada |
| 2012/0057757 A1 | 3/2012 | Oyama |
| 2012/0062743 A1 | 3/2012 | Lynam et al. |
| 2012/0316730 A1 | 12/2012 | Zhang et al. |
| 2013/0173115 A1 | 7/2013 | Gunia et al. |
| 2013/0231825 A1 | 9/2013 | Chundrlik, Jr. |
| 2013/0231830 A1 * | 9/2013 | Van Dan Elzen .... B60W 50/14 |
| | | | 701/42 |
| 2013/0253767 A1 | 9/2013 | Lee et al. |
| 2014/0176716 A1 | 6/2014 | Wallat |
| 2015/0210274 A1 * | 7/2015 | Clarke .................. B60W 30/00 |
| | | | 382/104 |
| 2015/0353085 A1 | 12/2015 | Lee |
| 2016/0046290 A1 * | 2/2016 | Aharony ............ G06K 9/00798 |
| | | | 701/41 |
| 2016/0318490 A1 * | 11/2016 | Ben Shalom ............. B60T 7/12 |

\* cited by examiner

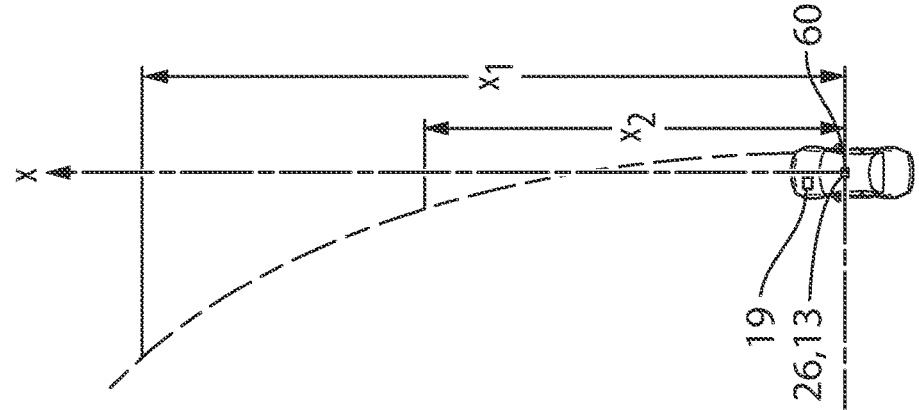
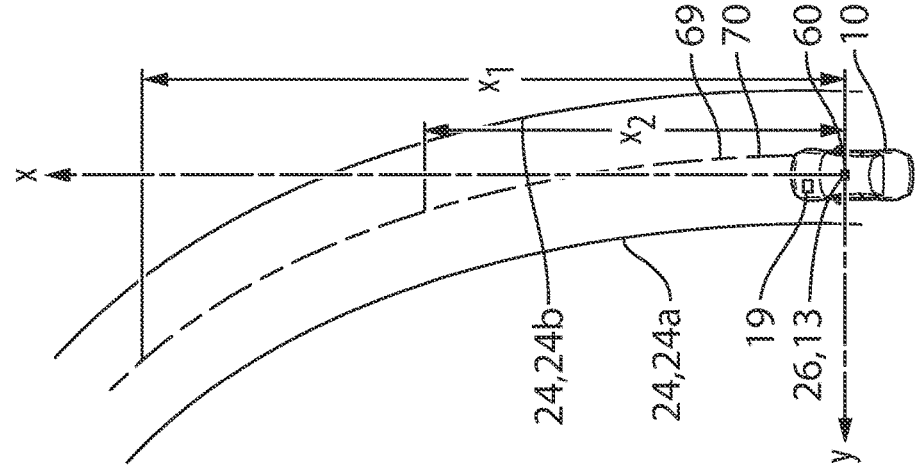
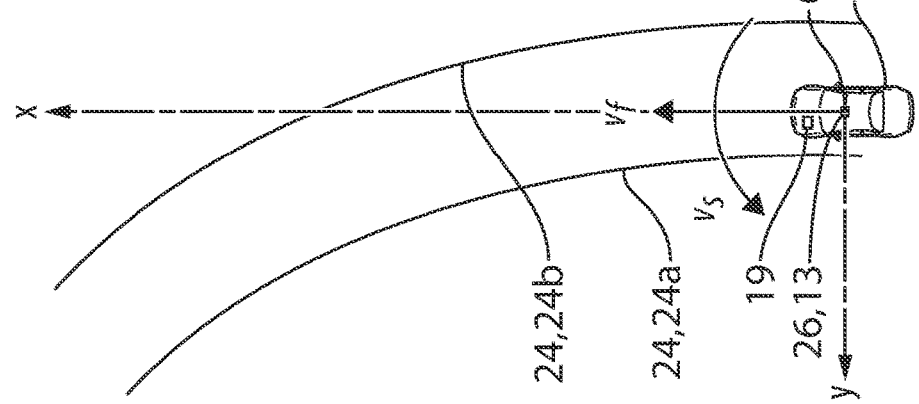

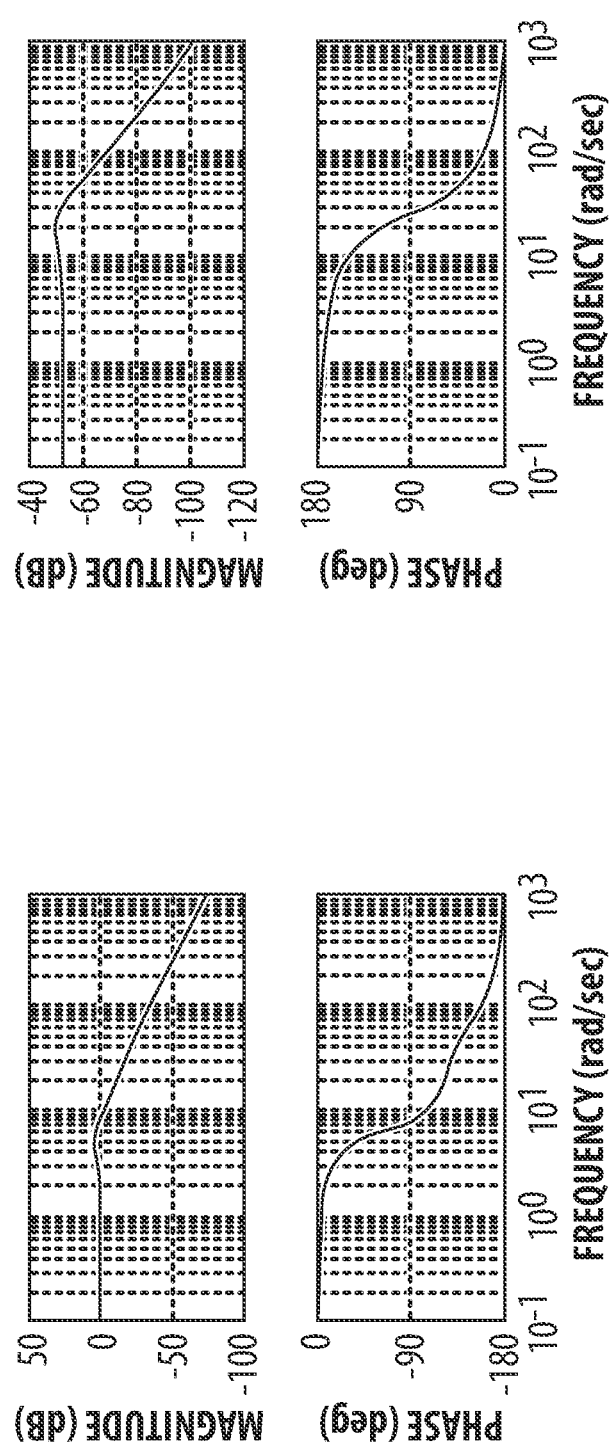

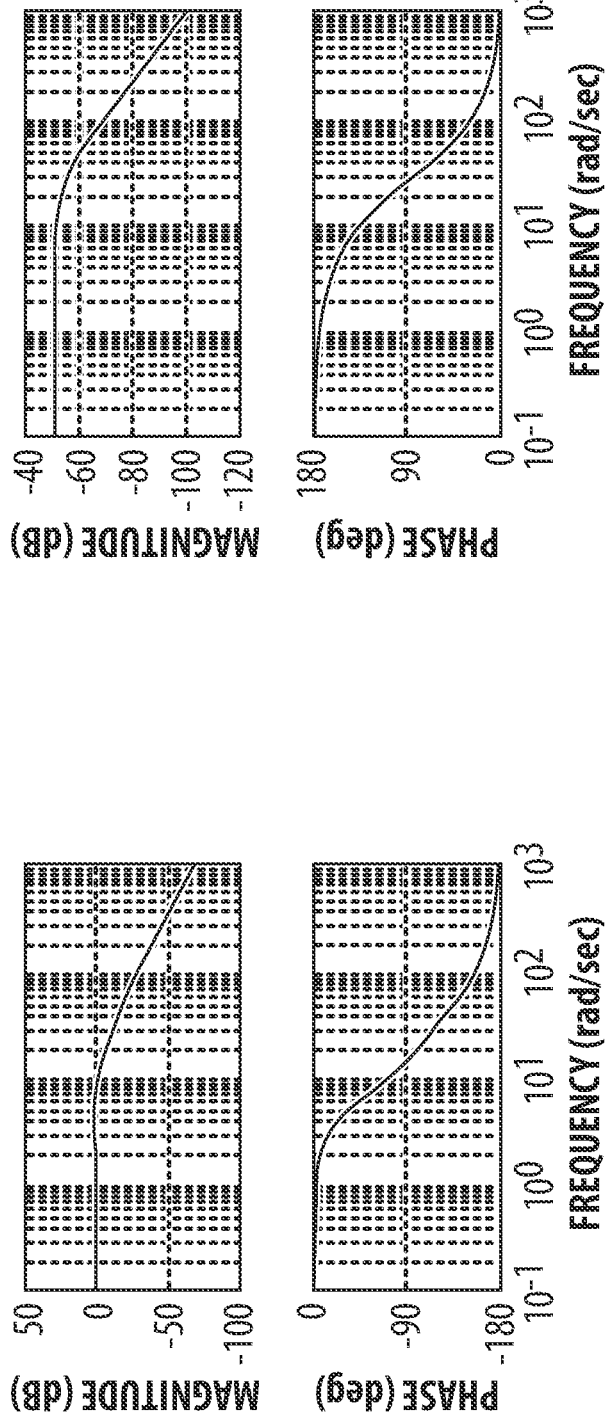

| RULE # | LEFT QUAL. | RIGHT QUAL. | LEFT ANGLE | RIGHT ANGLE | LEFT CURV. | RIGHT CURV. | CENTER OFFSET | LANE WIDTH | DECISION |
|---|---|---|---|---|---|---|---|---|---|
| 1 | GOOD | GOOD | STRAIGHT | STRAIGHT | | | | PROPER | CENTER |
| 2 | NOT GOOD | GOOD | | | | | | | RIGHT |
| 3 | GOOD | NOT GOOD | STRAIGHT | NOT STRAIGHT | | | | | LEFT |
| 4 | GOOD | GOOD | NOT STRAIGHT | STRAIGHT | | | | | LEFT |
| 5 | GOOD | GOOD | | | | | | PROPER | RIGHT |
| 6 | GOOD | GOOD | | | | | LEFT CLOSE | PROPER | LEFT |
| 7 | GOOD | GOOD | | | | | RIGHT CLOSE | IMPROPER | LEFT |
| 8 | GOOD | GOOD | NOT STRAIGHT | NOT STRAIGHT | | | | IMPROPER | RIGHT |
| 9 | GOOD | GOOD | | | DEFLECTION | DEFLECTION | | PROPER | CENTER |
| 10 | GOOD | GOOD | | | | | | PROPER | LEFT |

FUZZY RULES

FIG. 11

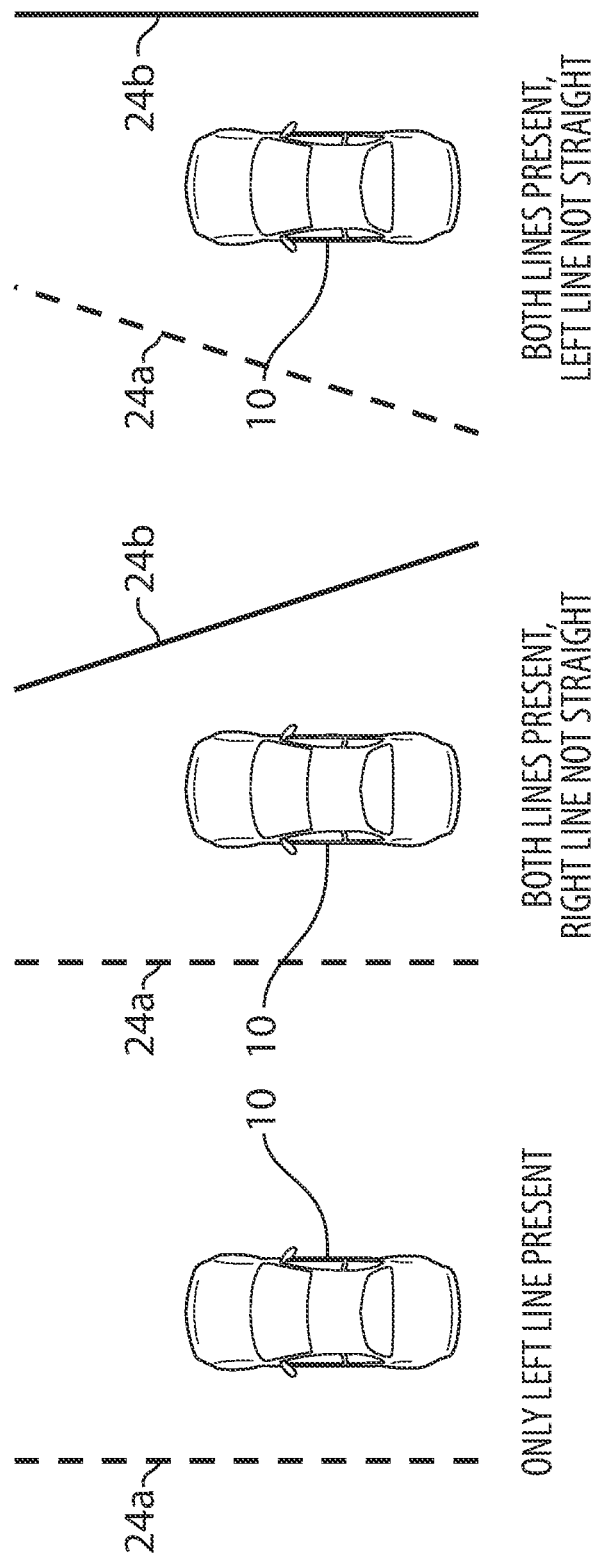

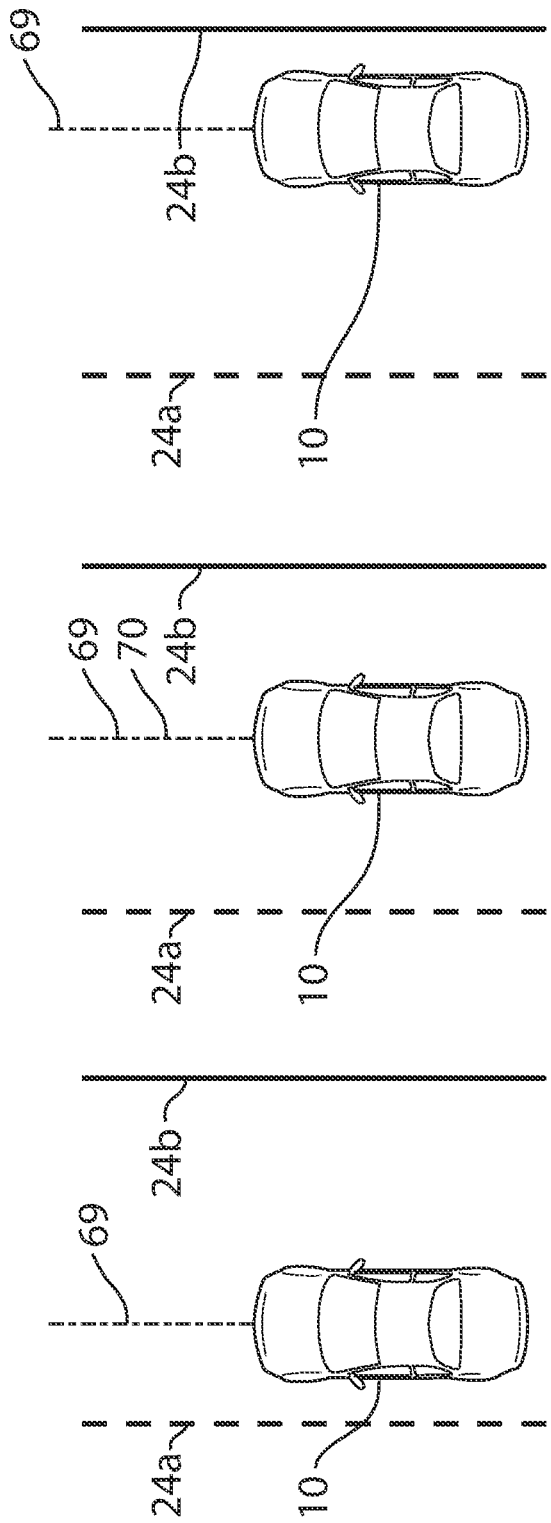

LANE KEEPING SYSTEM AND LANE CENTERING SYSTEM

CROSS REFERENCE TO RELATED APPLICATIONS

The present application is a continuation of U.S. patent application Ser. No. 14/935,700, filed Nov. 9, 2015, now U.S. Pat. No. 9,758,163, which is a continuation of U.S. patent application Ser. No. 13/884,752, filed May 10, 2013, now U.S. Pat. No. 9,180,908, which is a 371 national phase application of PCT Application No. PCT/US2011/061124, filed Nov. 17, 2011, which claims the priority benefit of U.S. provisional applications, Ser. No. 61/454,702, filed Mar. 21, 2011, and Ser. No. 61/415,409, filed Nov. 19, 2010.

FIELD OF THE INVENTION

The present invention relates to lane keeping systems and lane centering systems for use in vehicles.

BACKGROUND OF THE INVENTION

Some vehicles today are provided with lane keeping systems which are in the form of lane departure warning systems, which notify the driver of the vehicle in the event that the driver leaves his/her current lane. Such systems have several drawbacks. Many such systems notify the driver via audible means, which also notifies any passengers in the vehicle of the apparent driver error. Some drivers may feel embarrassed by the system's warnings and may thus be inclined to disable the system if possible.

Another drawback relates to when such systems act to notify the driver. Typically notify the driver only when the driver has already left the lane that he/she is in. At that time the vehicle's angle relative to the road may already be too large for the driver to have sufficient time to correct the vehicle's projected path to avoid veering off the road.

It would be advantageous to provide a lane keeping system that at least partially addresses at least one of the drawbacks described above.

Furthermore, it would be advantageous in some situations to provide a vehicle with the capability to autonomously keep itself in a lane during driving.

SUMMARY OF THE INVENTION

In a first aspect, the invention is directed to a lane keeping system for a vehicle. The lane keeping system sets a safe zone in which the driver can drive the vehicle. If the system determines that the driver is at risk of leaving the safe zone, the system takes a corrective action, such as notifying the driver or applying a steering correction to the vehicle. The system adjusts the width of the safe zone depending on the driver's capability to stay within the safe zone.

In a particular embodiment of the first aspect, the lane keeping system includes a controller and a lane delimiter detection device. The lane delimiter detection device is positioned to send information to the controller relating to the positions of a left lane delimiter on the road on a left side of the vehicle and a right lane delimiter on a right side of the vehicle. The controller is programmed or operable to:

a) establish a safe zone having a left safe zone delimiter based on the sensed positions of the left lane delimiters and a right safe zone delimiter based on the sensed positions of the right lane delimiters, wherein the safe zone has a width between the left and right safe zone delimiters, b) take a corrective action if the controller determines that the vehicle is at risk of unintentionally leaving the safe zone, wherein the corrective action is at least one action selected from the group of actions consisting of: notifying the driver that the vehicle is at risk of leaving the safe zone; and applying a steering correction to the vehicle, and c) adjust the positions of the left safe zone delimiter and the right safe zone delimiter so as to adjust the width of the safe zone if the vehicle remains within the safe zone for a selected period of time.

In a second aspect, the invention is directed to a lane keeping system for a vehicle, wherein the lane keeping system is configured to notify the driver of the vehicle discretely if the system determines that the vehicle is at risk of unintentionally leaving the lane, so as not to notify any passengers in the vehicle.

In a particular embodiment of the second aspect, the lane keeping system includes a controller, a lane delimiter detection device positioned to send information to the controller relating to the positions of a left lane delimiter on the road on a left side of the vehicle and a right lane delimiter on a right side of the vehicle, and an output device configured to send haptic feedback only to the driver of the vehicle. The controller is programmed or operable to:

a) determine whether the vehicle is at risk of unintentionally leaving the lane based on the information from the lane delimiter detection device; and b) notify the driver via the output device that the vehicle is at risk of leaving the lane based on the determination made in step a).

In a third aspect, the invention is directed to a lane keeping system for a vehicle, wherein the lane keeping system is configured to continue to check whether the vehicle is at risk of leaving the lane on one side of the lane even if the driver of the vehicle has activated the vehicle's turn signal to indicate that the driver wishes to leave the lane on the other side of the lane.

In a particular embodiment of the third aspect, the lane keeping system includes a controller, a lane delimiter detection device positioned to send information to the controller relating to the positions of a left lane delimiter on the road on a left side of the vehicle and a right lane delimiter on a right side of the vehicle, and an output device configured to send feedback to the driver of the vehicle. The controller is programmed or operable to:

a) determine whether the vehicle is at risk of unintentionally exiting the lane via a left side of the lane if the controller determines that the driver of the vehicle intends to exit the lane via a right side of the lane;

b) determine whether the vehicle is at risk of unintentionally exiting the lane via a right side of the lane if the controller determines that the driver of the vehicle intends to exit the lane via a left side of the lane; and c) notify the driver via the output device that the vehicle is at risk of unintentionally exiting the lane based on the determinations made in steps a) and b).

In a fourth aspect, the invention is directed to a lane centering system for use in a vehicle. The lane centering system is capable of autonomously steering the vehicle to remain within a lane. In one embodiment, the lane centering system includes a controller that determines a target path for the vehicle depending on certain parameters. For example, the target path for the vehicle is based at least in part on whether the controller has sufficient information to determine the positions of both lane delimiters or whether the controller can only determine the position of one of the lane delimiters. The target path may be selected based in part on whether the lane delimiters are parallel to the vehicle, or whether one or both of them are not parallel to the vehicle. In an embodiment, the controller models each of the lane delimiters in a simplified form. This facilitates the determination of one of the target paths (the centerline of the lane). The simplified form may be a $3^{rd}$ order polynomial equation.

In a particular embodiment of the fourth aspect, the lane centering system includes a lane delimiter detection device positioned to send information to the controller relating to the positions of a left lane delimiter on the road on a left side of the vehicle and a right lane delimiter on a right side of the vehicle, a steering assist device configured to apply steering corrections to the vehicle, and a controller programmed or operable to establish a target path for the vehicle based on information from the lane delimiter detection device. The controller is operatively connected to the steering assist device and instructs the steering assist device to apply selected steering corrections to the vehicle to steer the vehicle towards the target path. The target path is selected based at least in part on whether the controller has sufficient information to determine the positions of both lane delimiters or just one of the lane delimiters.

BRIEF DESCRIPTION OF THE DRAWINGS

The present invention will now be described by way of example only with reference to the attached drawings, in which:

FIG. 5a is a plan view of the vehicle as shown in FIG. 2, illustrating the modeling of the lane delimiters;

FIG. 5b is a plan view of the vehicle as shown in FIG. 2, illustrating the determination of the centerline of the lane and its offset from the vehicle's current position;

FIG. 5c is a plan view of the vehicle as shown in FIG. 2, illustrating the determination of the offset of the centerline of the lane relative to the vehicle's projected path based on the vehicle's steering angle and speed;

FIGS. 8a-8f, 9a-9f and 10a-10f show test results for closed-loop characteristics for three variants of the control scheme illustrated in FIG. 7;

FIG. 11 is a table illustrating decisions that are made by the lane centering system based on information determined regarding the lane delimiters;

FIGS. 12a-12i are plane views illustrating some of the situations described in the table in FIG. 11;

DETAILED DESCRIPTION OF THE INVENTION

Figure 1:
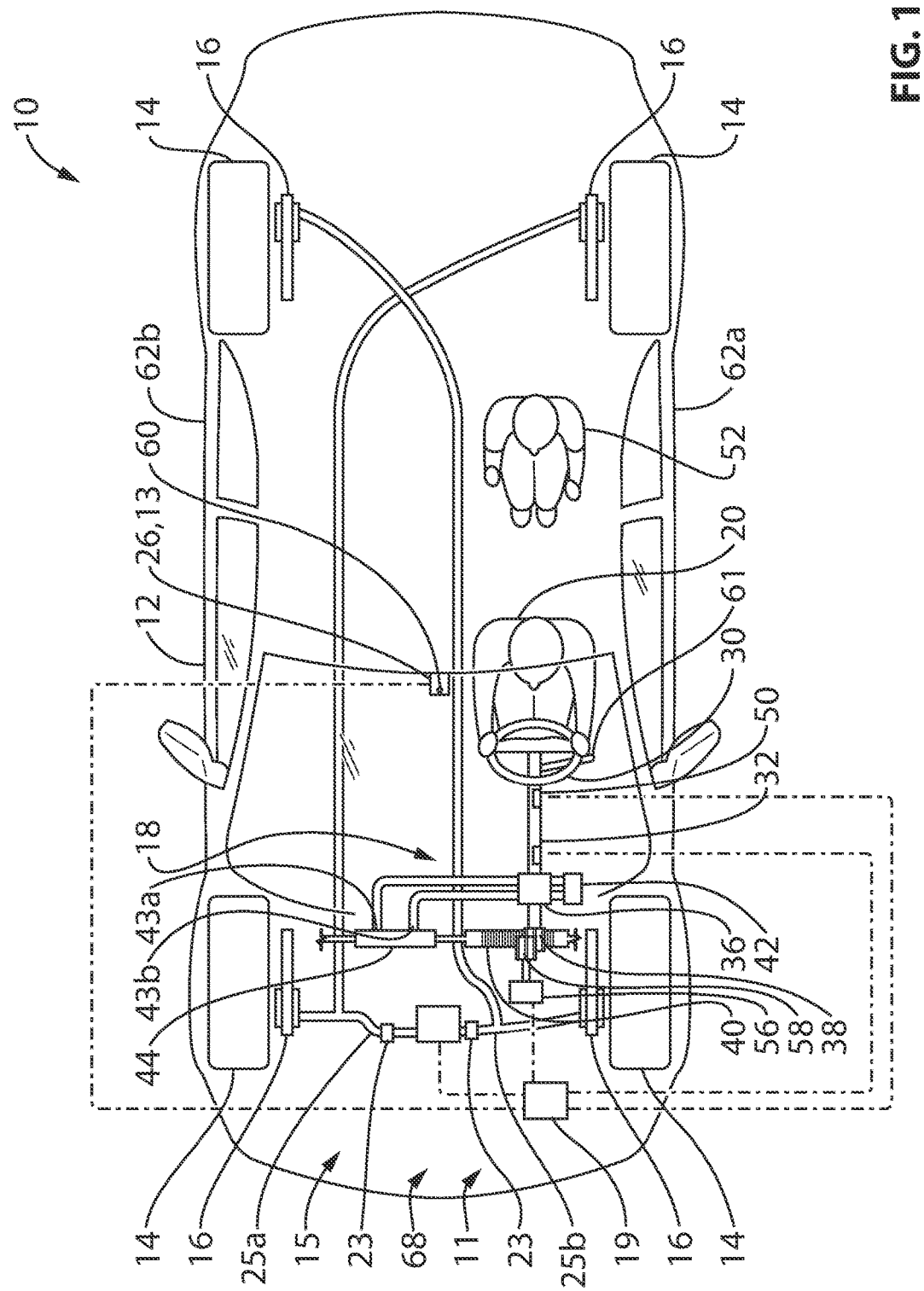
FIG. 1 is a transparent plan view of a vehicle with a lane keeping system in accordance with an embodiment of the present invention.

Reference is made to FIG. 1, which shows a vehicle 10 that includes a lane keeping system 11, in accordance with an embodiment of the present invention. The vehicle 10 has a body 12, a lane delimiter detection device 13 mounted to the vehicle body 12, a plurality of wheels 14 that support the body 12, a brake system 15 including a brake 16 associated with each wheel 14, a steering system 18 associated with the front wheels 14, and a controller 19 that controls the operation of lane keeping system 11. The lane keeping system 11 assists the driver (shown at 20) in keeping the vehicle 10 in its lane on a road. The lane is identified at 22 in FIG. 2 and the road is identified at 27.

The lane 22 is delimited by a first lane delimiter 24a on a first side of the vehicle 10 (e.g. the left side of the vehicle 10), and a second lane delimiter 24b on a second side of the vehicle 10 (e.g. the right side of the vehicle 10). The lane delimiters 24a and 24b may be any suitable types of delimiter, such as, for example, painted lines that are solid, painted lines that are broken, Bott's dots, or any other suitable type of delimiter. It will be understood that the lane delimiters 24a and 24b need not be the same. The lane 22 has a width $W_L$, which is the lateral distance between the first and second lane delimiters 24a and 24b.

The lane delimiter detection device 13 may be any suitable type of device. In the exemplary embodiment shown, the device 13 is a camera 26 that is positioned to have a forward field of view. The camera 26 may be, for example, positioned behind the windshield of the vehicle 10. While a camera is described herein, it will be understood that any other suitable lane delimiter detection device 13 may be used instead.

The camera 26 is connected to the controller 19 via any suitable means, such as an electrical conduit and sends images thereto which the controller 19 uses in order to determine the positions of the lane delimiters 24a and 24b.

The brake system 15 may be any suitable types of brake system such as a hydraulic brake system. The brake 16 at each wheel 14 may be a disc brake, as shown in FIG. 1. Alternatively, the brake system 15 could employ disc brakes on the front wheels 14 and drum brakes (not shown) on the rear wheels 14. In the embodiment shown, the brake system 15 further includes a master cylinder 21 that is actuated via a brake pedal (not shown) in the cabin, and two slave cylinders 23 which apply hydraulic pressure in respective brake circuits shown at 25a and 25b.

The steering system 18 may be any suitable type of steering system, such as, for example, a hydraulic power steering system. For example, the steering system 18 in the example shown in FIG. 1 includes a steering wheel 30 connected to a steering column 32. The steering column 32 drives a valve element from a rotary valve 36 through which the steering column 32 passes. The steering column 32 ends at a pinion 38, which engages a rack 40. The rotary valve 36 has two fluid lines that are connected to a reservoir/pump 42, and two other fluid lines that are connected to first and second cylinder ports 43a and 43b on a cylinder 44. As is known in the art, turning the steering wheel 30 turns the steering column 32, which in turn turns the valve element 34, which in turn controls the pressure of hydraulic oil at the two ports 43a and 43b of the cylinder 44. A piston (not shown) in the cylinder 44, which is connected to the rack 40 moves based on the pressure differential between the two ports. The rack 40 connects to each of the front wheels 14 via a tie rod and a steering arm (both of which are not shown so as not to obscure other components in FIG. 1).

The functionality of the lane keeping system 11 is described as follows. The lane keeping system 11 may be activated any suitable way. For example, it may be activated by pushing a button on the dashboard of the vehicle, or for example, it may be activated automatically when the vehicle reaches a selected activation speed (e.g. 60 kph), thereby indicating to the controller 19 that the vehicle is on a road with lanes (e.g. a highway, a large city road). When the vehicle speed falls below a selected deactivation speed (e.g. 55 kph), the lane keeping system 11 may automatically be deactivated. By deactivating the system 11 at a lower speed than the speed at which the system 11 is activated, the system is inhibited from rapidly turning on and off when the driver's speed hovers around the activation speed. It is alternatively, possible, however, for the system 11 to be programmed or operable to activate and deactivate at the same speed (e.g. 60 kph).

Once the system 11 is activated, the controller 19 receives images from the camera 26, uses them to determine the positions of the lane delimiters 24a and 24b, and determines the lateral distance between each of them and the vehicle 10. The controller 19 may use any suitable type of algorithm to detect the lane delimiters 24a and 24b. For example, the controller 19 may scan selected portions of the images for elements in a certain range of colors that would be representative of the color of typical highway lane markings, for a row of reflective elements that shine in a certain range of colors that would be representative of the color of Bott's dots. The controller 19 may take into account ambient lighting conditions. For example it may adjust the ranges of colors being searched for depending on the time of day.

The controller 19 also determines the initial positions of first and second safe zone delimiters 47a and 47b, which define an initial safe zone 48 for the vehicle 10. The safe zone 48 is a zone in which the controller 19 considers the vehicle 10 to not be at risk of unintentionally leaving the lane 22. The safe zone 48 has a width $W_S$, which is the lateral distance between the first and second safe zone delimiters 47a and 47b. The initial position of the first and second safe zone delimiters 47a and 47b may be selected any suitable way. For example, they may be selected as simply being a selected distance inboard from the first and second lane delimiters 24a and 24b. This permits the width of the safe zone 48 to vary depending on the width of the lane 22. Alternatively, the positions of the safe zone delimiters 47a and 47b may be selected by selecting an initial width $W_S$ for the safe zone 48 and centering the safe zone 48 between the lane delimiters 24a and 24b. Some other algorithm may alternatively be used to determine the initial positions for the safe zone delimiters 47a and 47b.

If the vehicle 10 leaves the safe zone 48 or is predicted by the controller 19 to be at risk of leaving the safe zone 48, the controller 19 may determine that it was in error and that the vehicle 10 is at increased risk of unintentionally leaving the lane 22, and activates an output device 50 to notify the driver 20. The output device 50 may be any suitable type of output device, such as, for example, a haptic output device, such as, for example, a vibratory motor that is connected to the steering wheel 30. By vibrating the steering wheel 30, the driver 20 is notified by the lane keeping system 11 of the apparent driving error, without notifying the passengers (shown at 52) in the vehicle 10. In this way, the vehicle driver 20 can correct the path of the vehicle 10 without any of the passengers 52 being made aware that the driver 20 needed notification by the system 11. This save the driver from embarrassment, and additionally saves the passengers 52 from potential stress or fear that the driver 20 is driving poorly. It will be noted that the vibratory motor need not be directly connected to the steering wheel 30 in order to cause the steering wheel 30 to vibrate. It is possible, for example, for the vibratory motor to be connected to the steering column 32 and to cause vibration of the steering column 32, which in turn would cause vibration of the steering wheel 30. Alternatively, a vibratory motor may be positioned elsewhere to notify the driver 20 discretely to adjust the path of the vehicle 20. For example, the vibratory motor may be positioned in the driver's seat (not shown). Notwithstanding the advantages provided by an output device 50 that notifies the driver 20 discretely, it is nonetheless within the scope of the invention to provide an output device 50 that provides an output reaches the driver 20 and the passengers 52. An example of such an output device 50 would be a speaker that emits audible chimes, messages, or other warning sounds.

If the vehicle 10 leaves the safe zone 48, the controller 19 may activate an optional steering assist device 54 that applies steering corrections to the vehicle 10 to urge the vehicle 10 back into the safe zone 48. The steering assist device 54 may have any suitable structure. For example the steering assist device 54 may include an electric motor 56 with a steering assist pinion 58 on its output shaft. The steering assist pinion 58 engages the main pinion 38.

When the controller 19 actuates the steering assist motor 56, the steering assist motor 56 urges the steering assist pinion 58 to drive the main pinion 38 with a selected steering correction torque in a selected rotational direction. The driver 20 feels the steering correction torque through the steering column 32. If the driver 20 in fact does wish to leave the lane 22, he/she may apply a torque (which may be referred to as a driver applied torque) on the steering wheel that overcomes the steering correction torque so that the vehicle 10 travels along whatever path they choose.

The steering assist device 54 could alternatively include something else instead of a steering assist motor 56. For example, the steering assist device 54 could control the hydraulic pressure to the cylinder ports 43a and 43b so as to urge the rack 40 in a selected direction hydraulically. By controlling the hydraulic pressure a selected torque would be applied to the steering column 32, which again could be overcome by the driver 20 through the steering wheel 30 if desired.

Regardless of the means used by the system 11 to control the steering system 18, the system is preferably configured so that the driver 20 can overcome the steering correction by applying at least a selected minimum torque on the steering wheel 30. The selected torque may be any suitable torque, such as, for example, 3 nm. The selected torque may vary depending on the particular situation. For example, the selected torque may be 3 nm on a straight road, but on a sufficiently sharp curve the driver 20 may need to apply 3 nm of torque just to keep the vehicle 10 in its lane, so a greater torque could be used as the selected torque that would signify that the driver 20 intends to change lanes 22 but has not activated the vehicle's turn signal. In an exemplary embodiment, the controller 19 may be programmed to determine from the images from the camera 16 whether the road has a curvature that is greater than some threshold curvature (e.g. about 0.0002 radians/m), and if it determined that the curvature was at least that great, then the controller 19 would use a second, larger selected torque (e.g. 5 nm) as the minimum input by the driver 20 before the controller 19 concludes that the driver 20 is intentionally steering the vehicle 10 to leave the lane 22. In situations wherein the driver does apply sufficient torque to overcome the system 11, the controller 19 may disable the system 11 temporarily (e.g. 10 seconds) so as to permit the driver 20 to complete the steering maneuver (e.g. a lane change) without interference from the system 11.

As yet another alternative, the steering assist device 54 could be a device that applies a selected amount of brake force to the brake 15 at the front wheel 14 on one side of the vehicle 10, so as to steer the vehicle 10 in a selected direction.

In yet another alternative embodiment for use in vehicles such as electrically powered vehicles that have a first motor powering at least one of the driver's side wheels and a second motor powering at least one of the passenger's side wheels, the steering assist device 54 could be a device that causes acceleration on one of the motors and deceleration on the other of the motors.

Some of the programming of the controller 19 in relation to lane keeping is described below. As noted above, the controller 19 may be programmed to select a safe zone 48 that is a selected distance inboard from the left and right lane delimiters 24a and 24b. This has an advantage over a system that selects a particular width for a safe zone and then centers the safe zone within the detected lane. In such a system it is at least theoretically possible for the system to become confused if, during use, it loses sight of one of the lane delimiters. It is possible that the system, in hunting for the missing lane delimiter, could inadvertently interpret a marking on the road outside the lane as being a lane delimiter. Under such a circumstance, the system might then re-center the safe zone within what it believes to be the newly established lane. Thus it is possible for the safe zone to suddenly shift over by several feet. As a result, the system could attempt to steer the vehicle towards the new safe zone, which could be undesirable if not disastrous. Instead, by programming the controller 19 to set the safe zone 48 as being a selected distance inboard from the lane delimiters 24a and 24b, it is less likely for such a scenario to occur.

In order for the controller 19 to determine whether the vehicle 10 is at risk of unintentionally leaving the lane 22, the controller 19 uses the images from the camera 26 to determine the positions of the lane delimiters 24a and 24b a selected distance ahead of the vehicle 10, such as, for example, 20 m ahead of the vehicle 10, up to about 100 m ahead of the vehicle depending on such factors as visibility, traffic, weather and time of day. The controller 19 determines the positions of the safe zone delimiters 47a and 47b a selected distance ahead of the vehicle 10 based on the positions of the lane delimiters 24a and 24b, and determines the vehicle's projected path based on a steering sensor (not shown) and optionally based on other parameters also. In particular, the controller 19 determines the projected path of one or more selected control points on the vehicle 10. In the exemplary embodiment shown in FIG. 1, the controller 19 selects one control point shown at 60, which is along the longitudinal centerline CL of the vehicle. The control point 60 may be, for example, the position at which the camera 16 is mounted in the vehicle (more particularly the lens of the camera 16). The vehicle 10 then determines if the vehicle 10 is projected to leave the lane 22, by determining if the projected path of the control point 60 leaves the safe zone 48. If the controller 19 determines that the projected path of the control point 60 will take the control point 60 outside the safe zone 48, and if the controller 19 has no indication that the driver 20 is exiting the lane 22 intentionally (e.g. by determining if the vehicle's turn signal is on), then the controller 19 may determine that the vehicle 10 is at risk of unintentionally leaving the lane 22. Upon reaching that determination, the controller 19 can take an action to correct the problem (e.g. by warning the driver, or for example, by automatically steering the vehicle 10 to bring the projected path of the control point 60 towards the center of the safe zone 48). Such actions (e.g. warning the driver 20, or applying a steering correction to the vehicle 10) may be referred to as corrective actions taken by the controller 19.

If the controller 19 determines that the vehicle's turn signal is on, the controller 19 may disable the lane keeping system 11 temporarily in such a way as to permit the driver 20 to complete the lane change without interference. In an exemplary embodiment, the controller 19 re-enables the system 11 ten seconds after the turn signal is shut off. The turn signal is shown in FIG. 1 at 61.

Optionally, if the turn signal 61 is activated, the controller 19 may be programmed to disable the activation of the system 11 on one side only (the side indicated by the turn signal activation). Thus the system 11 may continue to operate with the safe zone delimiter 47a or 47b as the case may be, on the other side of the lane 22. For example, if the driver 20 activates the turn signal 61 indicating that he/she is going to change to the next lane over to the left of the vehicle 10, then the controller 19 could disable the left safe zone delimiter 47b, while continuing to monitor whether the vehicle 10 is at risk of unintentionally leaving the right side of the lane 22 (i.e. by continuing to monitor the projected path of the vehicle 10 relative to the right safe zone delimiter 47a). If the controller 19 determines that the vehicle 10 is at risk of unintentionally leaving the right side of the lane 22, the controller 19 may take corrective action as described above (e.g. by warning the driver, or by applying a steering correction to the vehicle 10).

Figure 4:
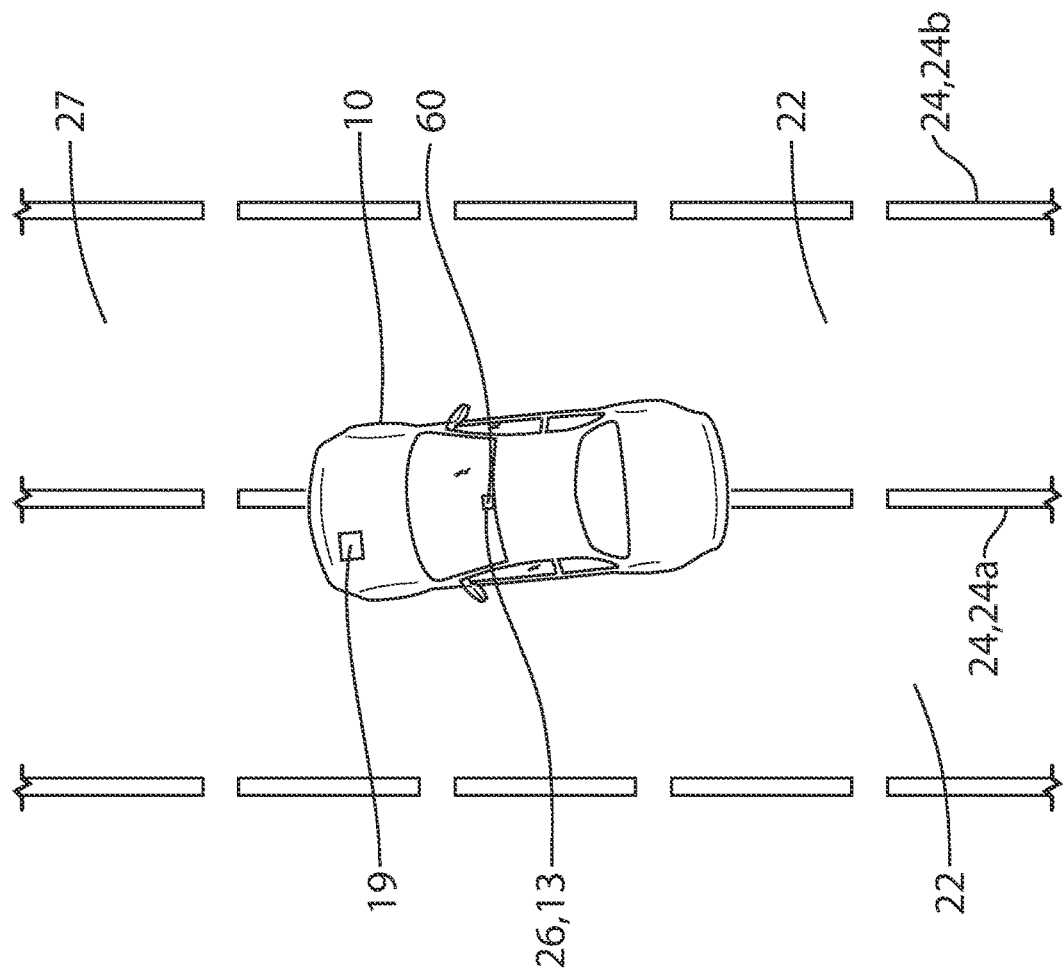
FIG. 4 is a plan view of the vehicle as shown in FIG. 2, wherein the vehicle is crossing from one lane into another.

It will be noted that, as the vehicle 10 crosses over the lane delimiter 24a in the above example (shown in FIG. 4), the controller 19 will, at some point, detect the lane delimiter 24a as the right lane delimiter since at some point it will no longer be on the left side of the vehicle 10. Since the controller 19 is still monitoring the vehicle's distance from the right safe zone delimiter, there is at least a theoretical possibility that the controller 19 could conclude that corrective action is suitable could proceed to notify the driver 20 or attempt to steer the vehicle 10 more aggressively into the left lane 22. To prevent this, when the controller 19 detects that the vehicle 10 is crossing the lane delimiter 24a, it may be programmed to disable the system's monitoring of the right safe zone delimiter temporarily for a selected period of time (e.g. 3 seconds) to permit the driver 20 to have time to complete the lane change. After the 3 second period, the controller 19 may reactivate the system 11. It will be understood that the controller 19 would also be programmed to disable the system's monitoring of the left safe zone delimiter temporarily when crossing over the right lane delimiter as part of an intentional lane change (e.g. wherein the driver 20 has put on the turn signal 61 to indicate a lane change to the right).

Figure 2:
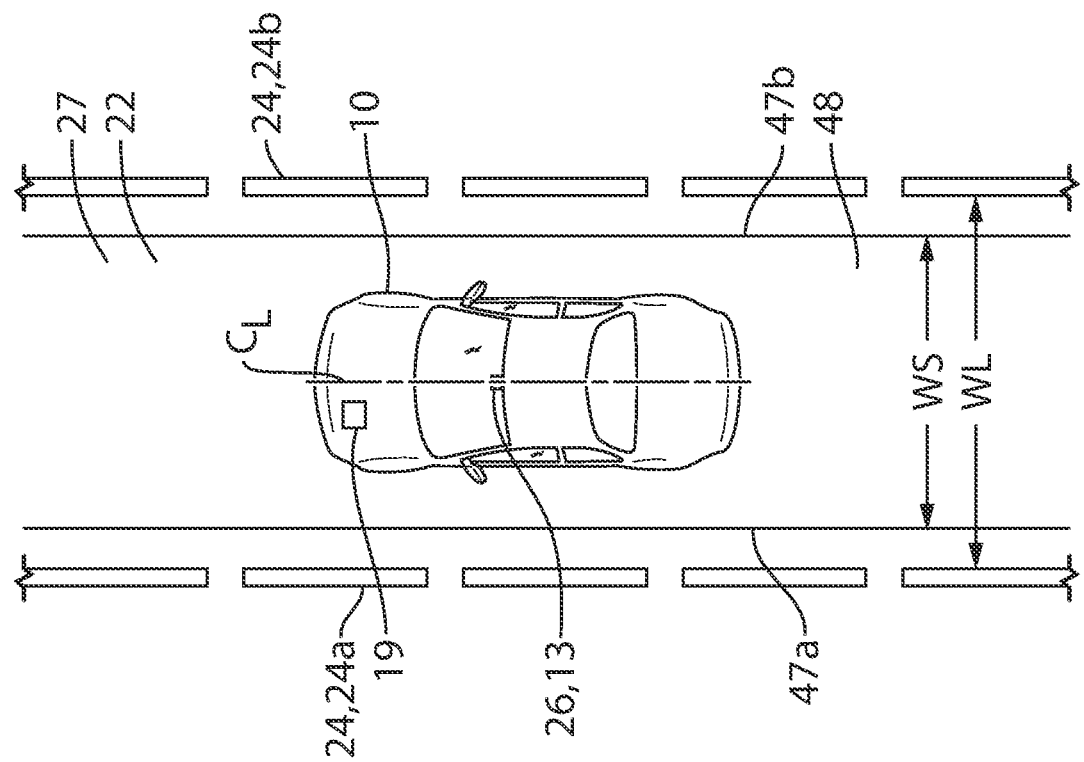
FIG. 2 is a plan view of the vehicle shown in FIG. 1 in a lane on a road, illustrating a safe zone established by the lane keeping system, wherein the safe zone has a first width.

Referring to FIG. 2, the initial positions of the safe zone delimiters 47a and 47b may be selected to be any suitable positions. For example, they may be selected to be one half of the vehicle's width inboard from the left and right lane delimiters 24a and 24b. If the control point 60 is on the centerline CL of the vehicle 10, the safe zone 48 is sized to permit the lateral edges of the vehicle 10 (shown at 62a and 62b) to be right at the lane delimiters 24a or 24b before the controller 19 determines that the control point 60 leaves the safe zone 48.

If, during driving, the controller 19 has not had to take any corrective action for a selected period of time, the controller 19 could reduce the width of the safe zone 48 by increasing the distances of the safe zone delimiters 47a and 47b inboard from their respective lane delimiters 24a and 24b. As a result, the controller 19 would take corrective action (e.g. warn the driver, or automatically steer the vehicle) when the vehicle is farther away from either lane delimiter 24a or 24b than it would have based on the initial positions for the safe zone delimiters 47a and 47b. As an example, the initial positions for the safe zone delimiters 47a and 47b may be selected to be, as noted above, one half of the vehicle's width from the lane delimiters 24a and 24b. Thus, for a vehicle that is 72 inches wide for example, the initial positions of the safe zone delimiters 47a and 47b may be 36 inches inboard from each of the lane delimiters 24a and 24b. After some period of driving, if the driver 20 has not caused the controller 19 to take corrective action, the controller 19 may adjust the positions of the safe zone delimiters 47a and 47b to be further inboard. For example, the controller 19 may move the safe zone delimiters 47a and 47b inboard by 2 mm for each second that the controller 19 has not needed to take corrective action (i.e. for each second that the controller 19 has not determined that the vehicle 10 was at risk of leaving the lane 22). The controller 19 may continue adjusting the safe zone delimiters 47a and 47b progressively inboard until it reaches maximum inboard positions for them. The maximum inboard positions may be selected based on any suitable criteria, such as the width of the vehicle 10, the width of the lane 22 or some determined minimum acceptable width for the safe zone 48. In an exemplary embodiment, the maximum inboard positions of the safe zone delimiters 47a and 47b may be selected to correspond with the wheels 14 of the vehicle 10 being 75 cm inboard from the lane delimiters 24a and 24b, or may correspond to providing a safe zone 48 having a selected alternative width, (e.g. 20 cm), whichever is smaller. In other words, for a lane 22 that is 350 cm wide and a vehicle that is 170 cm wide, if the maximum inboard positions of the safe zone delimiters 47a and 47b is taken to put the wheels 75 cm inboard from the lane delimiters 24a and 24b, that would correspond to a first prospective safe zone width of 30 cm. Since 20 cm is smaller than 30 cm, the controller 19 will permit the safe zone delimiters 47a and 47b to move 80 cm inboard from each of the lane delimiters 24a and 24b so that the safe zone width reaches a minimum width of 20 cm. For a lane 22 that is 330 cm wide and a vehicle that is 170 cm wide, if the maximum inboard positions of the safe zone delimiters 47a and 47b is taken to put the wheels 75 cm inboard from the lane delimiters 24a and 24b, that would correspond to safe zone with of 10 cm. Since 10 cm is smaller than 20 cm, the controller 19 will permit the safe zone delimiters 47a and 47b to move 75 cm inboard from each of the lane delimiters 24a and 24b so that the safe zone width reaches a minimum width of 10 cm. The controller 20 will, of course, not permit the safe zone width to be smaller than zero. In other words, the controller 19 verifies whether the first prospective safe zone width (which is based on a selected offset inboard from the left and right lane delimiters 24a and 24b) represents a safe zone that would permit some lateral movement of the vehicle 10 in the lane 22. If the first prospective safe zone width would not permit some lateral movement of the vehicle 10, then the controller 19 would select the alternative width value as the minimum safe zone width.

When widening the safe zone 48, the controller 19 may be programmed to permit the safe zone delimiters to reach a maximum outboard position that is 30 cm past (i.e. outboard from) the lane delimiters 24a and 24b.

If at any time the controller 19 determines that the vehicle 10 is at risk of unintentionally leaving the lane 22 and takes corrective action, the controller 19 may adjust the positions of the safe zone delimiters 47a and 47b outward if they are not already at their maximum outboard positions. For example, the controller 19 may adjust the safe zone delimiters 47a and 47b outwards by some amount each time it is required to take corrective action. The controller 19 may be programmed to adjust the safe zone delimiters 47a and 47b outwards faster than it adjusts them inwards. For example, if the driver 20 stays within the safe zone 48 and does not cause the controller 19 to take corrective action, the controller 19 may adjust the safe zone delimiters 47a and 47b inwardly at a rate that would bring them from their maximum outboard positions to their maximum inboard positions in a selected period of time, such as 5 minutes. By contrast, if the driver 20 is repeatedly not staying within the safe zone 48 and is repeatedly causing the controller 19 to take corrective action, then the controller 19 may adjust the safe zone delimiters 47a and 47b outwardly at a rate that would bring them from their maximum inboard positions to their maximum outboard positions in a selected period of time, such as 2 minutes.

Figure 3:
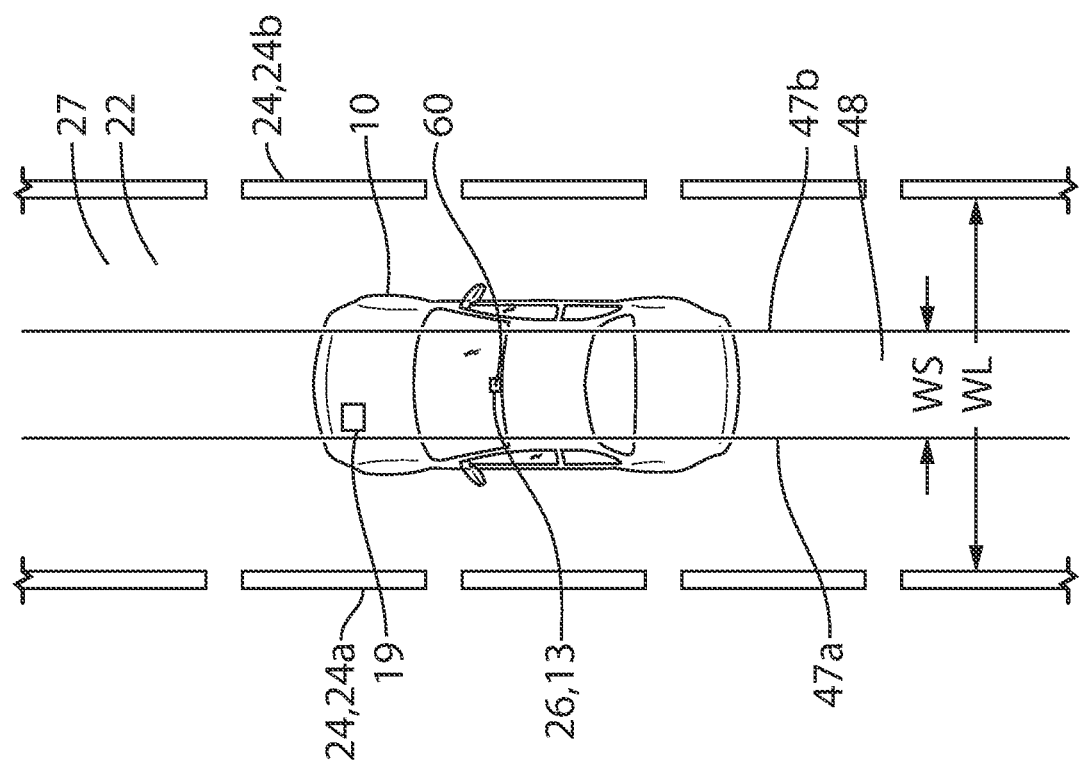
FIG. 3 is a plan view of the vehicle as shown in FIG. 3, wherein the safe zone has a second, smaller width.

By adjusting the safe zone 48 inwardly and outwardly based on driver performance at staying within the safe zone 48, the controller 19 rewards those who stay within the safe zone 48 without relying on corrective action by the controller 19 with increased safety by way of having a tighter safe zone 48 so that the corrective action is carried out sooner to inhibit the vehicle sooner from leaving the lane 22, as shown in FIG. 3. By contrast, those who rely more heavily on corrective action by the system 12 to keep them in the safe zone 48 wind up having a safe zone 48 that is relatively wider, which means that the driver 20 is warned when the vehicle 10 is closer to actually leaving the lane 22, as shown in FIG. 2. By providing the controller 19 with the capability of taking corrective action sooner (as shown in FIG. 3) the driver 20 is provided with earlier warning of the potential of leaving the lane 22, which gives the driver 20 more time to correct the path of the vehicle 10 (and gives the controller 19 more time to correct the path of the vehicle 10 in embodiments wherein the controller 19 has that capability). Additionally, by taking corrective action sooner (e.g. warning the driver 20 sooner or by autonomously carrying out a steering correction on the vehicle 10 sooner), a smaller steering correction is required to keep the vehicle 10 within the lane 22. A smaller steering correction is preferable in terms of passenger safety than a larger steering correction.

In embodiments wherein the controller 19 is programmed to carry out steering corrections on the vehicle 10, the driver 20 may be tempted to take their hands off the steering wheel and let the vehicle 10 steer itself. In order to prevent this, the controller 19 may optionally be programmed to detect if the driver 20 has let go of the steering wheel 30. If it does detect this, the controller 19 disables the lane keeping system 11 temporarily for some period of time (e.g. 10 seconds) and notifies the driver 20 that the system 11 has been disabled. When the driver's hands are on the steering wheel 30 the driver 20 applies a small but measurable torque on the steering wheel 30 with some regularity as the driver 20 makes small steering corrections while driving. The lane keeping system 11 may include a torque sensor on the steering column 32 to detect this torque. The controller 19 receives signals from the torque sensor, which permit the controller 19 to detect if the driver 20 has let go of the steering wheel 30. Specifically, if the torque applied to the steering wheel is above some threshold torque, such as for example, 0.3 nm, the controller 19 assumes that the torque was applied by the driver 20 and that the driver 20 is actively involved in steering the vehicle 10. The controller 19 starts a time counter to determine the amount of time elapsed after receiving a signal indicating a torque applied by the driver 20. If the elapsed time after the last indication of a driver applied torque exceeds some threshold value (e.g. 8 seconds), then the controller 19 warns the driver 20 and disables the lane keeping system 11 temporarily. If the driver 20 applies a torque on the steering wheel 30 before the threshold amount of time elapses then the controller 19 does not disable the system 11 and resets the time counter to begin counting again.

Aside from disabling the system 11 during activation of the turn signal 61, and when the torque applied by the driver 20 on the steering wheel 30 exceeds a selected value, the controller 19 may be programmed to disable the system 11 under other conditions also. For example, the controller 19 may be programmed to disable the system 11 when the controller 19 detects that the driver 20 has applied the brakes 16 (e.g. by detecting a signal from a brake pedal sensor shown at 64 on the brake pedal, shown at 66, or, for example, by receiving a signal from a collision mitigation system that a braking event is taking place). Additionally, if the vehicle 10 is equipped with an adaptive cruise control system or the like, the controller 19 may disable the system 11 if it detects that a forward collision warning signal has been triggered. In either of these cases (i.e. detection of braking by the driver 20 or triggering of a collision warning), the controller 19 permits the driver 20 to maneuver the vehicle 10 as necessary to avoid a collision without interference from the lane keeping system 11.

In situations where the controller 19 cannot detect one of the lane delimiters 24a or 24b for more than a selected period of time (e.g. 1 second), the controller 19 may be programmed to gradually reduce the amount of assistance (i.e. corrective action) it provides to the driver 20. In a situation where the controller 19 does not detect a lane delimiter 24a or 24b for more than a second selected period of time (e.g. 3 seconds), the amount of assistance provided by the lane keeping system 11 may reduce to zero (i.e. no assistance). A gradual reduction in the amount of assistance may be achieved by gradually revising the positions of the associated safe zone delimiter 47a or 47b outwards by some selected amount. When the controller 19 detects the missing lane delimiter 24a or 24b again it can revise the position of the associated safe zone delimiter 47a or 47b back to its position prior to when the lane delimiter 24a or 24b stopped being detected. The controller 19 may treat each of the lane delimiters 24a and 24b independently with respect to this detection and reduction in assistance.

In situations where the vehicle 10 is driving past an on-ramp or an off-ramp, one of the lane delimiters 24a or 24b may end temporarily. In such situations the lane delimiter 24a or 24b may reappear after less than one second (depending on driving speed) and is expected to, in many situations, reappear after less than 3 seconds, so that the system 11 remains operational at least to some extant throughout the period during which the vehicle 10 is passing the on-ramp or off-ramp.

Reference is made to FIG. 1. Instead of, or in addition to, the lane keeping system 11, the vehicle 10 may include a lane centering system 68. The lane centering system 68 is used to autonomously steer the vehicle and keep the vehicle within its lane 22 (FIG. 2). The lane centering system 68 may be considered to be an advanced lane keeping system. The lane centering system 68 may include many of the same components as the lane keeping system 11, including the lane delimiter detection device 13, which may be the camera 26, the controller 19 and the steering assist device 54. For use in the lane centering system 68, the controller 19 is programmed to detect the left and right lane delimiters 24a and 24b using images from the camera 26, in the same fashion as described above for the lane keeping system 11. The controller 19 then selects a target path shown at 69 (FIG. 5b) in the lane 22 based on the information it has gleaned regarding the left and right lane delimiters 24a and 24b. In situations where the left and right lane delimiters 24a and 24b are detectable and meet certain other criteria described further below, the target path 69 selected by the controller 19 corresponds generally to the theoretical centerline shown at 70 of the lane 22.

The controller 19 may be programmed in any suitable way to determine the position of the centerline 70 for the lane 22. In an exemplary embodiment, using the images from the camera 26, the controller 19 may model the left and right lane delimiters 24a and 24b in the form of $3^{rd}$ order polynomial equations. As shown in FIG. 5a, an X axis and a Y axis are positioned with the control point 60 on the vehicle 10 at the origin. The left lane delimiter 24a may be stored in the memory of the controller 19 as an equation in the form of $Y_L = D_L X^3 + A_L X^2 + B_M X + C_L$, where $D_L$, $A_L$, $B_L$ and $C_L$ are selected by the controller 19 in any suitable way, so as to form a curve that, when adjusted for the perspective of the camera 26, closely matches the left lane delimiter 24a that appears in the images sent from the camera 26 to the controller 19. The right lane delimiter 24b may be stored in the memory of the controller 19 as an equation in the form of $Y_R = D_R X^3 + A_R X^2 + B_R X + C_R$, where $D_R$, $A_R$, $B_R$ and $C_R$ are selected by the controller 19 in any suitable way, so as to form a curve that, when adjusted for the perspective of the camera 26, closely matches the right lane delimiter 24b that appears in the images sent from the camera 26 to the controller 19. The position of the centerline 70 can be determined as the average of the two polynomial equations. The position of the centerline is thus determined by the polynomial $Y_C = D_C X^3 + A_C X^2 + B_C X + C_C$, where $D_C = 0.5(D_L + D_R)$, where $A_C = 0.5(A_L + A_R)$, where $B_C = 0.5(B_L + B_R)$, and where $C_C = 0.5(C_L + C_R)$.

Reference is made to FIG. 5b. After determining the position of the centerline 70, the controller 19 calculates the lateral offset $Y_{P1}$ between the vehicle's current position and a point on the centerline 70 of the lane 22 that is some distance $X_1$ forward of the vehicle 10 along the X axis, using the formula $Y_{P1} = D_P X_1^3 + A_P X_1^2 + B_P X_1 + C_P$. The distance $X_1$ may be determined based on the vehicle's current forward speed $V_F$ and a selected period of time $T_1$ (e.g. 0.6 to 1.2 seconds) that the controller 19 is programmed to 'look ahead' so as to safely guide the vehicle 10. In addition, in some embodiments, the controller 19 may also calculate the lateral offset $Y_{P2}$ between the vehicle's current position and a point on the centerline 70 of the lane 22 that is some second selected distance $X_2$ forward of the vehicle 10 along the X axis, using the formula $Y_{P2} = D_P X_2^3 + A_P X_2^2 + B_P X_2 + C_P$. This second distance $X_2$ represents a second selected period of time $T_2$ (e.g. 0.3 to 0.6 seconds) that the controller 19 may also be programmed to 'look ahead' so as to safely guide the vehicle. The lateral offsets $Y_{P1}$ and $Y_{P2}$ may be referred to as target path lateral offsets because they represent the offsets between the vehicle's current position and points on the target path 69 ahead of the vehicle 10. Where the target path 69 is the centerline 70 of the lane 20, the lateral offsets $Y_{P1}$ and $Y_{P2}$ may also be referred to as centerline lateral offsets.

Reference is made to FIG. 5c. The controller 19 may further be programmed to determine the anticipated lateral offset of the vehicle 10 which is referred to as $Y_{A1}$ at the selected distance $X_1$ based on the vehicle's current yaw rate, $V_S$. The vehicle's current angular orientation is represented by its yaw rate, $V_S$. The anticipated lateral offset $Y_{A1}=X_1 V_S T_1$. The anticipated lateral offset of the vehicle 10 at the second selected distance $X_2$ is $Y_{A2}=X_2 V_S T_2$.

Once the target path lateral offsets $Y_{P1}$ and $Y_{P2}$ and the anticipated lateral offsets $Y_{A1}$ and $Y_{A2}$ are determined, they can be compared to each other so that the controller 19 can determine an appropriate steering input to apply into the steering assist device 54. It is optionally possible for the controller to not determine $Y_{P2}$ and $Y_{A2}$ and thus to work only with the first offsets $Y_{P1}$ and $Y_{A1}$ to determine an appropriate steering input.

To determine a suitable steering torque $T_C$ to apply to the steering system, the relationship between accelerator position and forward speed $V_F$ is modeled, and the relationship between steering torque $T_C$ and the resulting yaw rate $V_S$ is modeled. The modeling may take place prior to programming the controller 19. The models may be used to generate a look up table that the controller 19 uses when determining a steering torque $T_C$ to apply to the vehicle 10.

Figure 6:
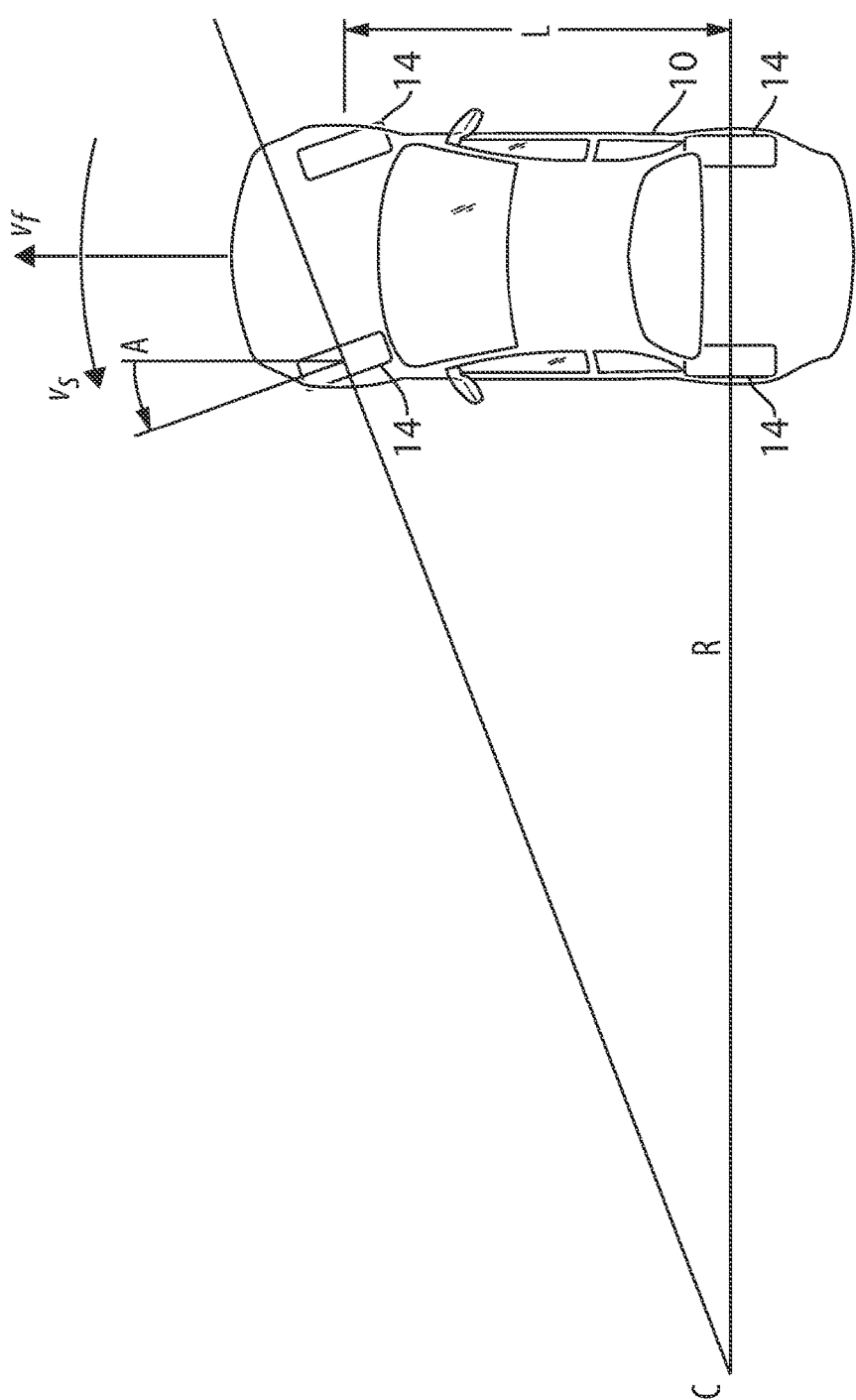
FIG. 6 is a plan view of the vehicle as shown in FIG. 2, illustrating the determination of the vehicle's projected path.

The models used may differ for different vehicles. An exemplary model is described below with reference to FIG. 6, based on the vehicle being set up with Ackermann geometry. The vehicle 10 is shown in FIG. 6. $U_F$ is the input from the accelerator pedal. $V_F$ is the forward velocity of the vehicle 10 in whatever direction it is pointing (which is not necessarily the direction in which the wheels 20 are pointed). A transfer function is applied to $U_F$ to derive $V_F$. The transfer function is: $K_V/(T_V S+1)$, where S is a Laplace transform and $K_V$ and $T_V$ are parameters of the transfer function.

With continued reference to FIG. 6, when the vehicle 10 is turning, the inside front wheel 14 is turned at some angle, shown at A, which is different than the angle of the outside front wheel 14. The wheelbase of the vehicle 10 is L, and the radius from the center C of the turn to the inside front wheel 14 is R. As an approximation, the distance from the center C to the inside rear wheel is also approximately equal to R. Thus, TAN(A) is approximately equal to L/R. $V_S=V_F/R$ which is approximately equal to $V_F$ TAN(A)/L.

$T_C$ is the steering torque requested. From a given steering torque $T_C$, a transfer function is applied to derive A. The transfer function is: $K_S/(S(T_S S+1))$, where $K_S$ and $T_S$ are parameters of the transfer function. As shown above, for a given angle A, $V_S$ is approximately equal to $V_F$ TAN(A)/L. Using these relationships, a steering torque $T_C$ can be selected to be applied based on the difference between the anticipated lateral offset $Y_{A1}$ of the vehicle 10 as compared to the target path lateral offset $Y_{P1}$.

Figure 7:
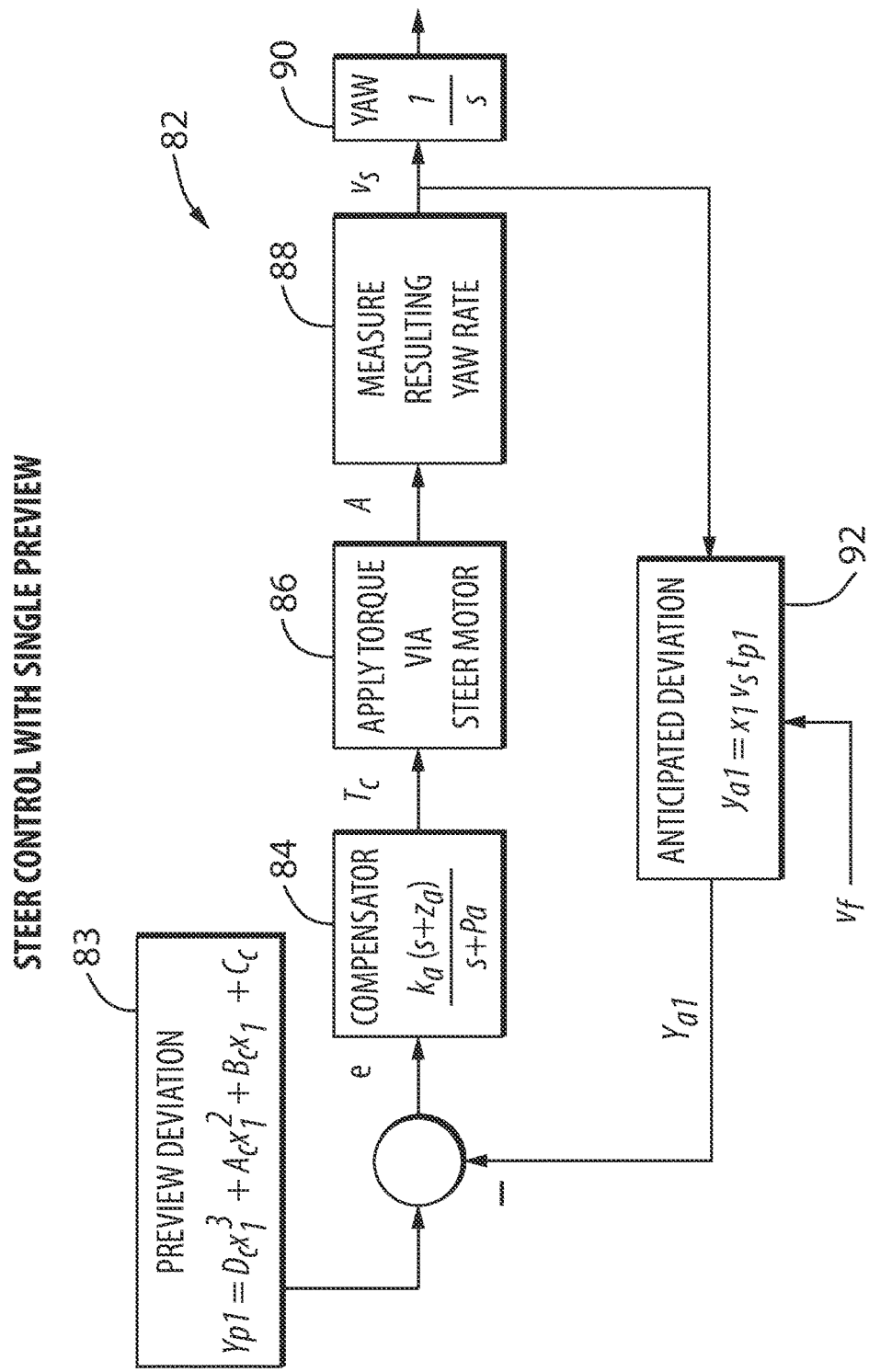
FIG. 7 is a flow diagram illustrating the programming of the controller involved in determining a target path for the vehicle and steering the vehicle towards a target path.
Figures 8A, 8B:
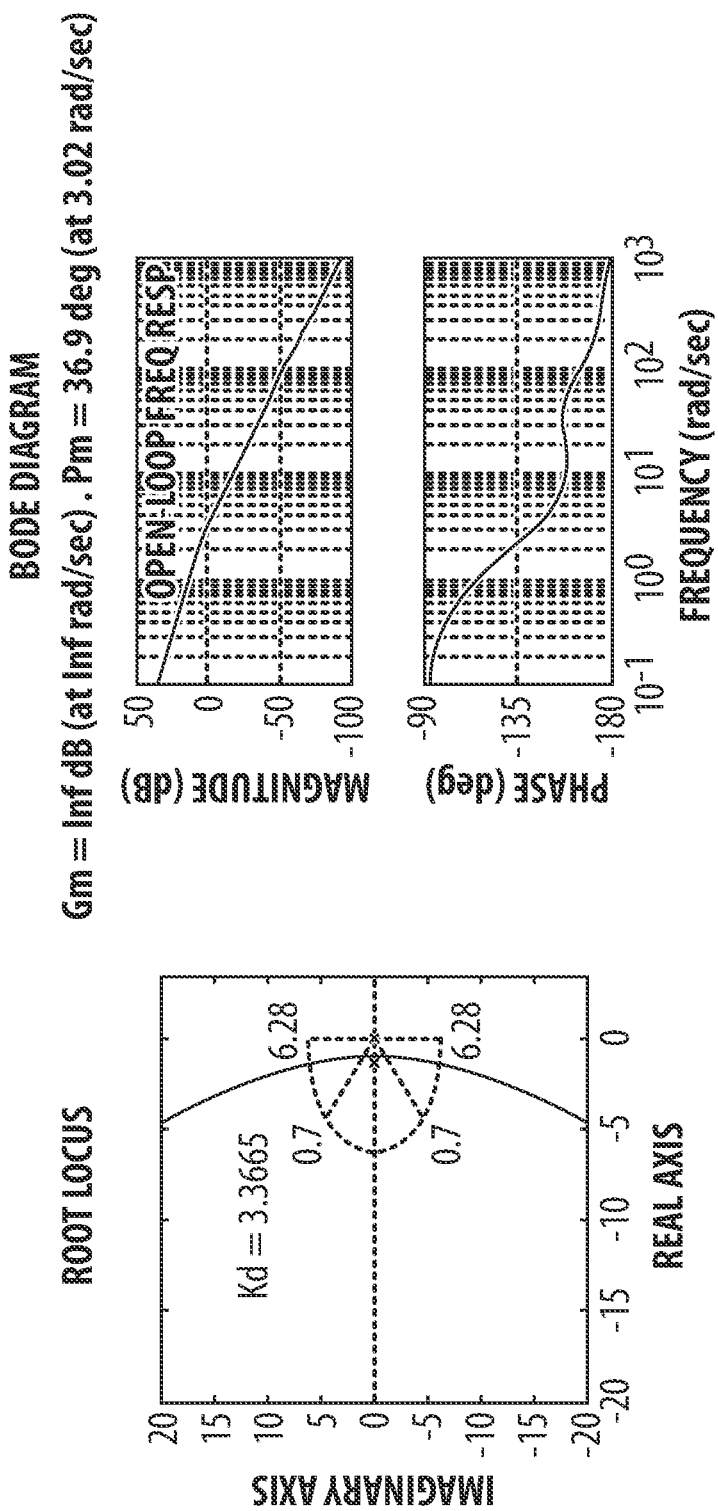
Figures 8C, 8D:
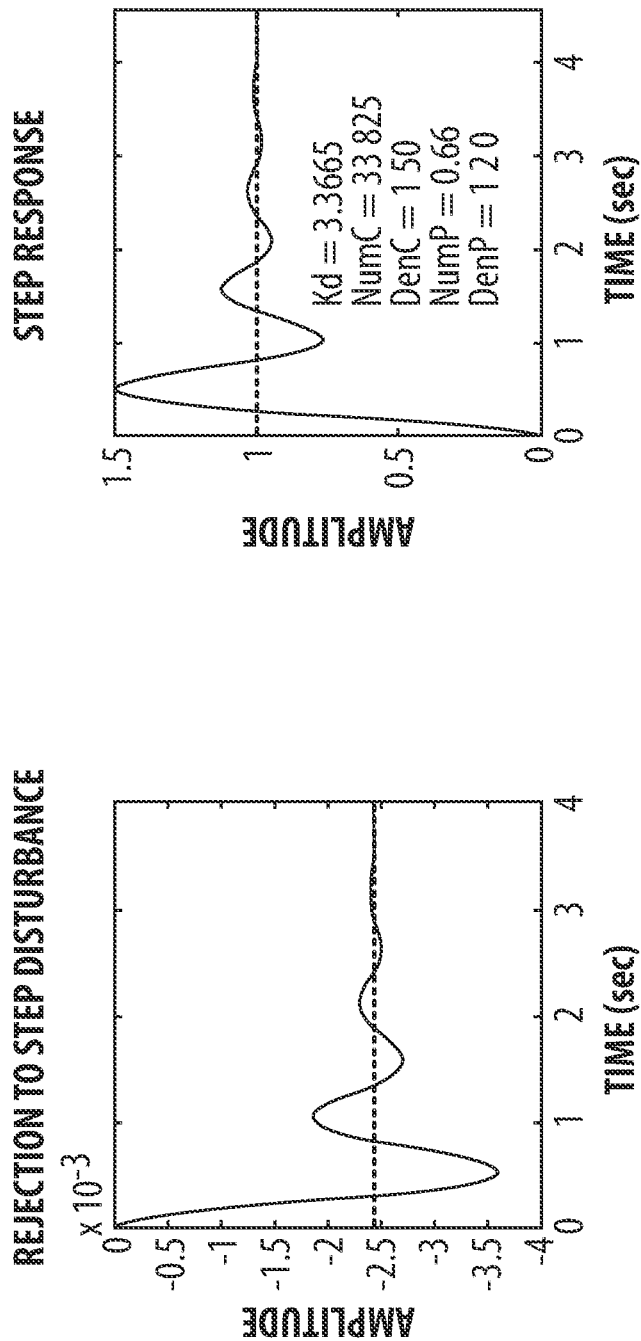
Figures 8E, 8F:
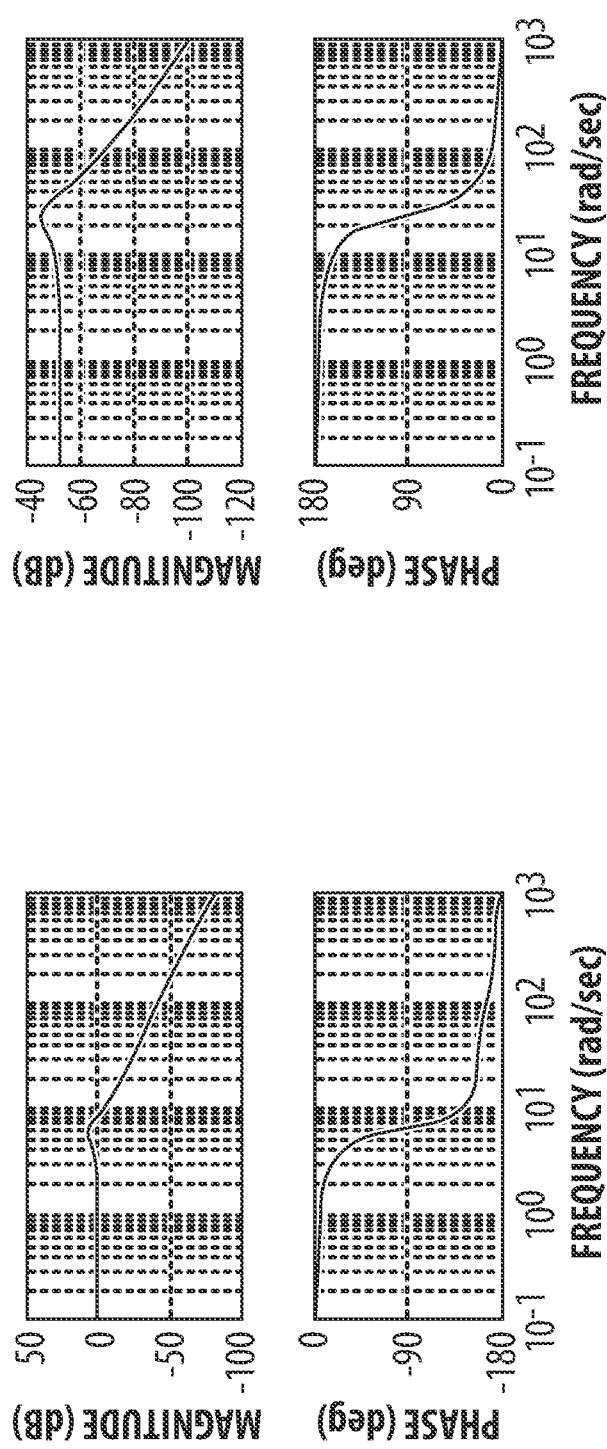
Figures 9A, 9B:
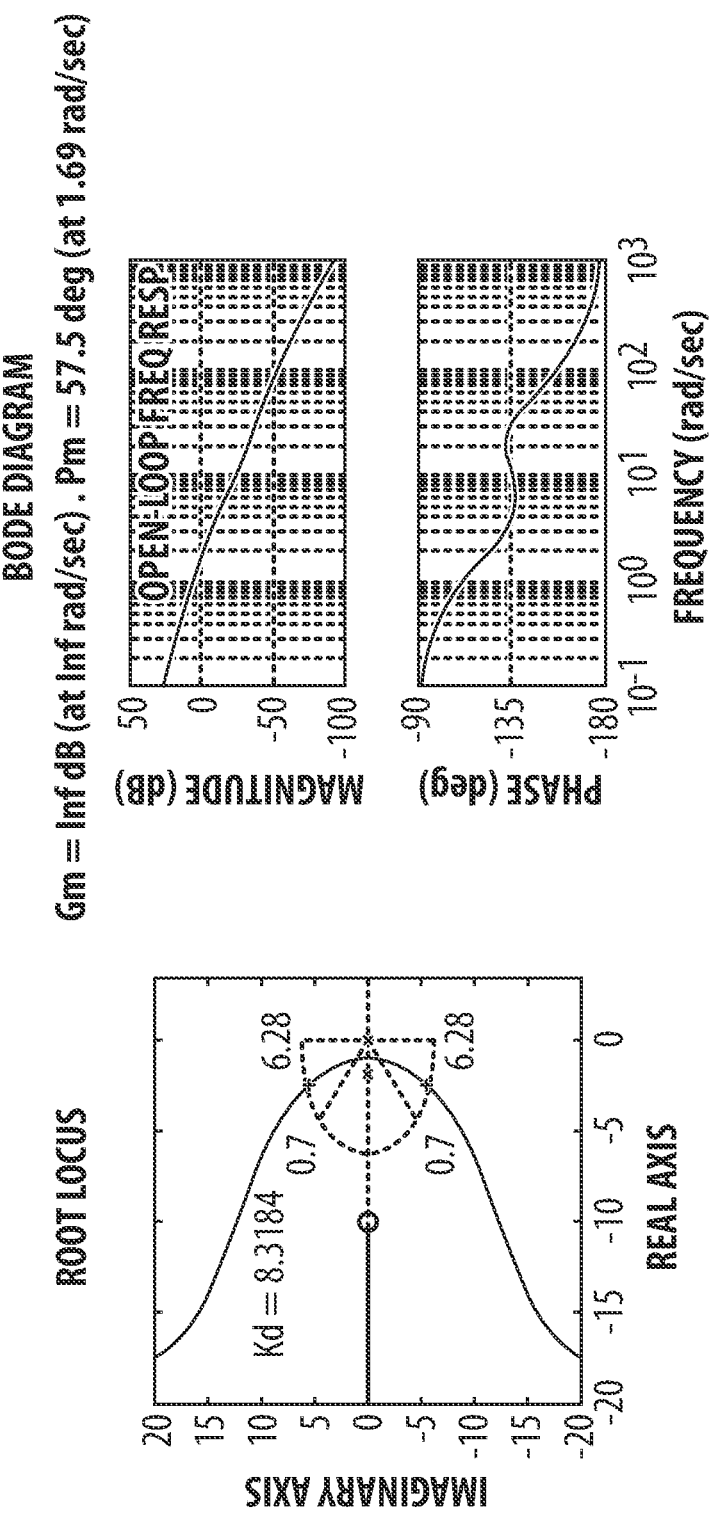
Figure 9D:
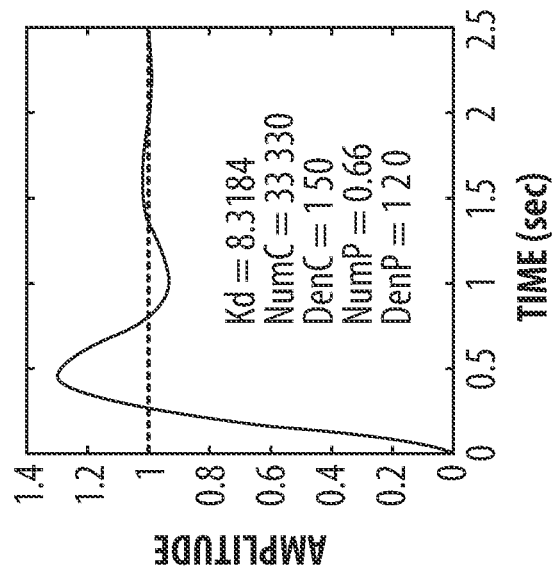
Figure 9C:
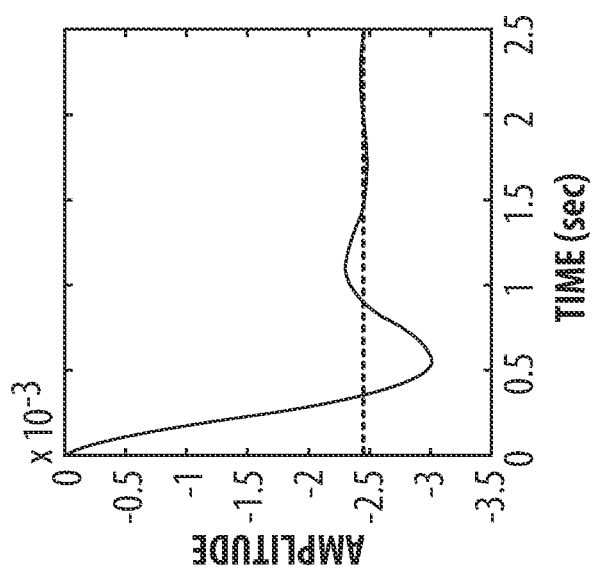
Figures 10A, 10B:
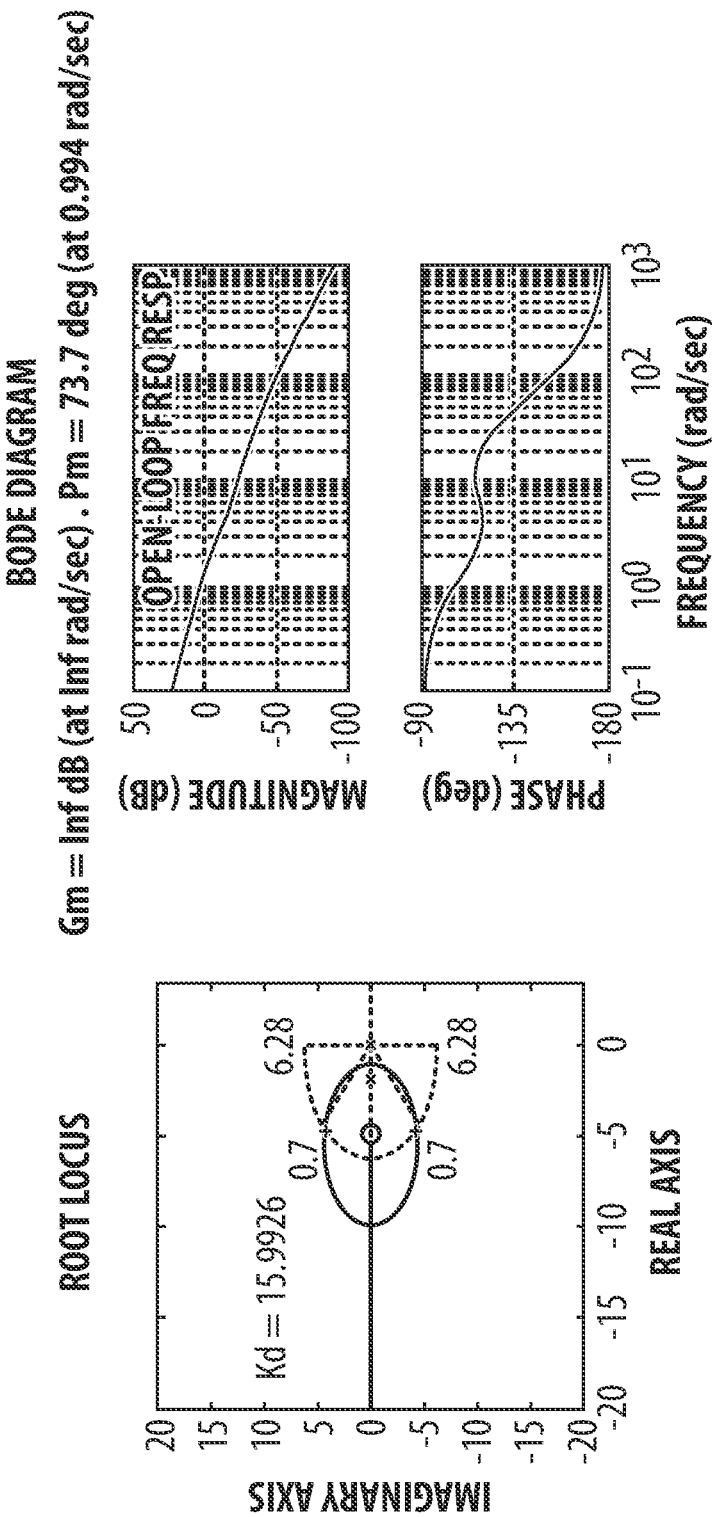
Figure 10D:
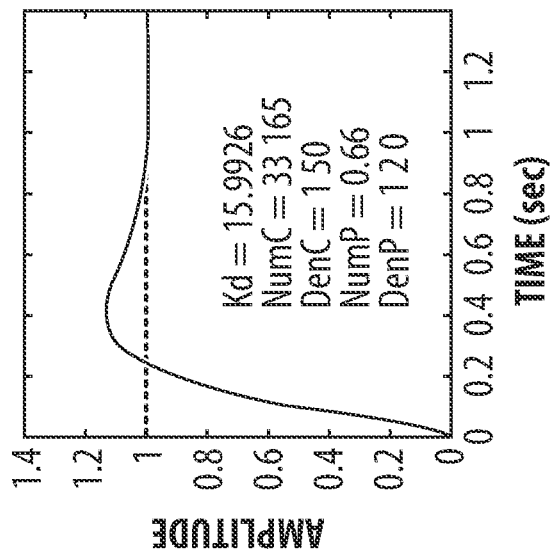
Figure 10C:
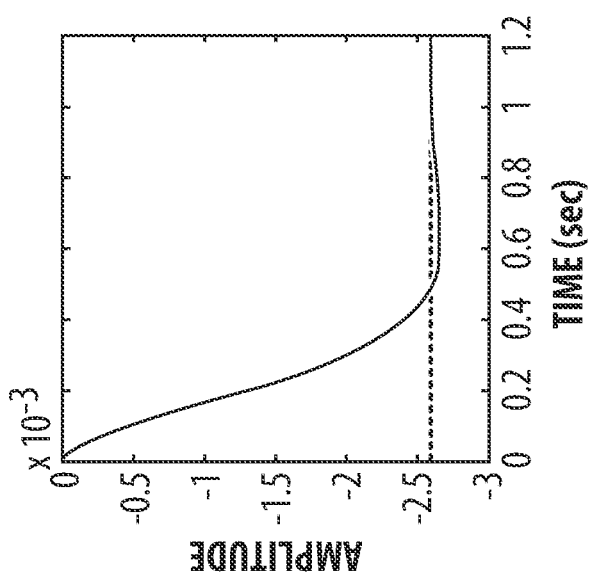

The controller 19 may use a closed loop control system shown at 82 in FIG. 7 to refine the selected steering torque $T_C$. The controller 19 is programmed with a target path offset module 83 (which may be referred to as a centerline offset module 83 when the target path 69 is the centerline 70), a compensator module 84, a steer motor module 86, a yaw rate determination module 88, and an anticipated offset module 92. The target path offset module 83 is used to determine the target path offset $Y_{P1}$. In this example where the target path 69 is the centerline 70, the target path offset $Y_{P1}$ is calculated as described above. The control system 82 determines an anticipated lateral offset $Y_{A1}$ as described above. A difference between the two, (which is represented by the letter e in FIG. 7), is used as the input to the compensator module 84 where a transfer function is applied to the difference e to determine a value for $T_C$. The transfer function applied is that the input is multiplied by $k_A(S+z_A)/(S+p_A)$, where $k_A$, $z_A$ and $p_A$ are the gain, zero and pole for the function. These values may be selected by any suitable means.

The control system 82 then proceeds to the steer motor module 86 where the steering torque $T_C$ is applied to the steering system 18 and the wheel angle A results. The wheel angle A is not measured, however the vehicle 10 includes a means for measuring the yaw rate $V_S$ that results from the steering torque $T_C$. Thus at module 88, the yaw rate $V_S$ is measured. The measured $V_S$ can be used as input to an optional yaw module 90 where a transfer function is applied to $V_S$ to determine a yaw for the vehicle 10, the value of which may be used by other controllers for other purposes in the vehicle 10. The control system 82 then proceeds to the anticipated offset module 92 which is used to determine the new anticipated offset $Y_{A1}$ of the vehicle 10 based on the new yaw rate $V_S$ that was determined. As noted in FIG. 7, this module 92 uses the forward speed $V_F$ of the vehicle 10 as one of its inputs, which is used to determine the distance $X_1$. The anticipated offset is determined by applying the formula $Y_{A1}=X_1 V_S T_1$. The control system 82 also recalculates the target path offset in module 83, and then again determines the difference between the anticipated offset $Y_{A1}$ and the target path offset $Y_{P1}$ to generate the input e to the compensator module 84 again in order to refine the steering torque $T_C$ applied. The controller 19 selects the gain $k_A$ to use in the compensator module 84 based at least in part on the vehicle's forward speed $V_F$. The control system 82 continues to iteratively proceed through these aforementioned steps, redetermining the steering torque $T_C$ to apply and then applying it.

The characteristics of the closed loop control system 82 depend on the compensator module 84. FIGS. 8a-8f, 9a-9f and 10a-10f show test results for the closed-loop characteristics for three different compensators. Each set of figures shows a root locus plot, a Bode diagram of the open loop characteristics, tracking closed loop characteristics and disturbance rejection loop characteristics. The rejection response to a step input is also included. The first set of characteristics (FIGS. 8a-8f) is shown where a 50 percent peak overshoot in the step response is permitted. The value of $k_A$ is selected to be 3.3665×33, the value of $z_A$ is selected to be 25 and the value of $p_A$ is selected to be 50. The second set of characteristics (FIGS. 9a-9f) is shown where a 30 percent peak overshoot in the step response is permitted. The value of $k_A$ is selected to be 6.3184×33, the value of $z_A$ is selected to be 10 and the value of $p_A$ is selected to be 50. The third set of characteristics (FIGS. 10a-10f) is shown where a 10 percent peak overshoot in the step response is permitted. The value of $k_A$ is selected to be 15.9926×33, the value of $z_A$ is selected to be 5 and the value of $p_A$ is selected to be 50.

It will be noted that the required torque to generate a desired yaw rate $V_S$ decreases as vehicle speed increases. The steady state gain of the control system 82 varies to keep the poles at roughly the same locations, regardless of the vehicle speed.

The above programming is used to steer the vehicle 10 towards a target path 69 that corresponds generally to the centerline 70 of the lane 22, shown in FIG. 6b. In certain situations however, the controller 19 may determine that the target path 69 is not along the theoretical centerline 70, and will instead steer the vehicle 10 towards a target path 69 that is based on one of the lane delimiters 24a or 24b instead. To determine what kind of target path will be selected, the controller 19 first determines values for a set of parameters 94 (FIG. 11), represented by a set of variables 96a-96h. The variables include, for example, variables 96a and 96b, which represent the quality of information available to the controller 19 from the images sent by the camera 26 for each of the lane delimiters 24a and 24b. Based on selected criteria, the controller 19 will determine whether the information received from the lane delimiter detection device 13 relating to each lane delimiter 24a and 24b meets a selected threshold of quality (i.e. whether the controller 19 has received sufficient information from the lane delimiter detection device 13 (i.e. the camera 26) to determine the positions of each of the lane delimiters 24a and 24b). For lane delimiter 24a, the controller 19 will store a value of 'good' (if the quality of the information is sufficiently good), or 'not good' (if the quality of the information is not sufficiently good) in the right lane delimiter information quality variable shown at 96a. For lane delimiter 24b, the controller 19 will store a value of 'good' (if the line quality is sufficiently good) or 'not good' (if the line quality is not sufficiently good) in the left lane information quality variable shown at 96b. The controller 19 further determines the offset for each lane delimiter 24a and 24b from the vehicle 10 and stores the offset distance to the right lane delimiter 24b in a right lane delimiter offset variable, and stores the offset distance to the left lane delimiter 24a in a left lane delimiter offset variable. The controller 19 further determines the angles of the left and right lane delimiters 24a and 24b relative to the vehicle 10. If the left lane delimiter 24a is parallel to the vehicle 10, the controller 19 stores a value of 'straight' in a left lane angle variable 96c. If the left lane delimiter 24a is not parallel to the vehicle 10, the controller 19 stores a value of 'not straight' in the left lane angle variable 96c. The controller 19 performs a similar analysis for the right lane delimiter 24b and stores a value of 'straight' or 'not straight' in a right lane delimiter angle variable 96d. The controller 19 further determines the amount of curvature of the lane delimiters 24a and 24b and stores their values in units of 1/m in lane delimiter curvature variables respectively. The controller 19 determines the lane width $W_L$ based on the offset values stored in the left lane and right lane delimiter offset variables. The controller 19 determines whether the lane width is within a selected range that is considered normal. If it is within the selected range, the controller 19 stores a value of 'proper' in a lane width properness variable 96h. The controller 19 further determines whether the center of the vehicle 10 is offset to the left of the center of the lane 22 or is offset to the right of the center of the lane 22 by storing values relating to how close the vehicle 10 is to the left and right lane delimiters 24a and 24b in left close and right close variables, which are together identified under variable 96g.

The controller 19 further determines the difference in deflection between the lane delimiters 24a and 24b. The deflection of each lane delimiter 24 is the lateral offset of the lane delimiter 24 at some selected distance ahead of the vehicle 10. In the exemplary embodiment described herein the deflection is measure at a distance corresponding to 2 seconds of travel of the vehicle 10. The deflection may be determined by any suitable means. In the exemplary embodiment, it is determined by extrapolating the third order curve fit for the lane delimiter markings detected by the camera 26, thus using lane delimiter position, heading, curvature and curvature derivative. The controller 19 determines if there is a difference in the deflections of the left and right lane delimiters 24a and 24b as a means of detecting off-ramps on a highway.

Referring to FIG. 11, a table is shown that applies a series of 'preliminary decisions' based on the values of the parameters 94 determined above. Ten different situations 120 (shown individually at 120a-120j) are shown in the table in FIG. 11. It will be noted that the ten situations are not all mutually exclusive. For example, it is possible that, a single set of parameters 94 could meet the conditions shown in situation 120h and situation 120j. The controller 19 goes through the list of situations and determines which situations apply to the values of the parameters 94. For each situation that applies, a particular preliminary decision shown at 122 is outputted. The decisions are shown individually at 122a-122j. The three possible target paths 69 available to be selected are: a target path along the center of the lane 22, a target path that is an offset from the right lane delimiter 24b, or a target path that is an offset from the left lane delimiter 24a. It is possible that the parameters 94 could meet the conditions in two or more situations 120 that would result in conflicting decisions 122 as to which type of target path 69 to follow. As a hypothetical example, the controller 19 may determine that the left lane delimiter quality and the right lane delimiter quality are both good, that neither the left nor right lane delimiters are straight (i.e. parallel to the vehicle 10), that the lane width is proper and that the there is a difference in deflection in the lane delimiters 24a and 24b towards the left. Thus, the values of the parameters 94 match the values shown in situation 120h, which would result in a preliminary decision 122h to set a target path 69 along the centerline 70 of the lane 22. However, the values of the parameters 94 also match the values shown in situation 120j, which would result in a preliminary decision 122j to set a target path 69 that is an offset from the right lane delimiter 24b. Once all the preliminary decisions 122 for the ten situations 120 are received, the controller 19 determines a final decision outcome based on the outcomes of the preliminary decisions 122a-122j. For example, the controller 19 may perform a weighted average of the decisions to determine the final decision. The value of the weighted average may be a number that is between 0 and 1. A value of 0 indicates a very strong final decision outcome to follow the left lane delimiter 24a. A value of 1 indicates a very strong decision outcome to follow the right lane delimiter 24b. A value of 0.5 indicates a very strong decision to follow the center of the lane 22. The controller 19 applies thresholds to determine what final decision outcome to select. In the exemplary embodiment, for a value of between 0.4 and 0.6 inclusive, the controller 19 will follow the center of the lane. For a value less than 0.4, the controller 19 will follow the left lane delimiter 24a. For a value of more than 0.6, the controller 19 will follow the right lane delimiter 24b.

The weighted average may be arrived at using a form of fuzzy logic for each decision 122. For example, each variable 96 may have a 'raw value' variable M associated with it, which is determined by the controller 19 based on its analysis of the images from the camera 26. The raw value variable M is then used as input to a lookup table or a formula or the like to determine the values of two further associated variables, M1 and M2. Thus, variable 96a which relates to the quality of the left lane delimiter 24a, has a raw value variable Ma associated with it, and two further associated variables, Ma1 and Ma2 associated with it. The variables Ma1 relates to the 'strength' of the value stored in the raw value variable Ma. The variable Ma2 relates to the 'weakness' of the value stored in the raw value variable Ma.

Figure 13:
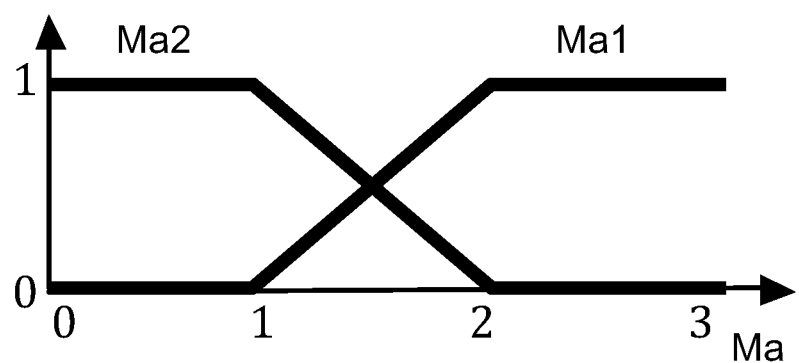
FIG. 13 is a graph illustrating the relationships between variables associated with one of the parameters used to make the decisions shown in the table in FIG. 11.

Thus Ma1 and Ma2 are inversely proportional. In this exemplary system, Ma1 and Ma2 together add up to a total value of 1. A graph shown in FIG. 13 relates the value contained in the raw value variable Ma to the two variables Ma1 and Ma2. Thus, if the controller 19 determines that the left lane quality value is 1.75, this is the value stored in the raw value variable Ma. This value is used to determine the values of Ma1 and Ma2. In this example, using the graph shown in FIG. 13 this would result in a value of Ma1 of 0.75, and a value of 0.25 for Ma2, which means that the quality of the left lane delimiter is more good than bad. The quality of the right lane delimiter 24b may be determined using a similar method, whereby the raw value variable is Mb, and the two associated variables are Mb1 and Mb2.

The variable 96c, which relates to the 'straightness' of the left lane delimiter 24a, would have a raw value variable Mc associated with it and two further variables Mc1 and Mc2. The value of Mc may be the angle in degrees that the left lane delimiter 24a is away from 'straight ahead'. The values of Mc1 and Mc2 are shown in the exemplary graph shown in FIG. 14. A similar graph to that shown in FIG. 14, would be applicable for variables Md, Md1 and Md2 associated with right lane 'straightness' variable 96d.

Figure 14:
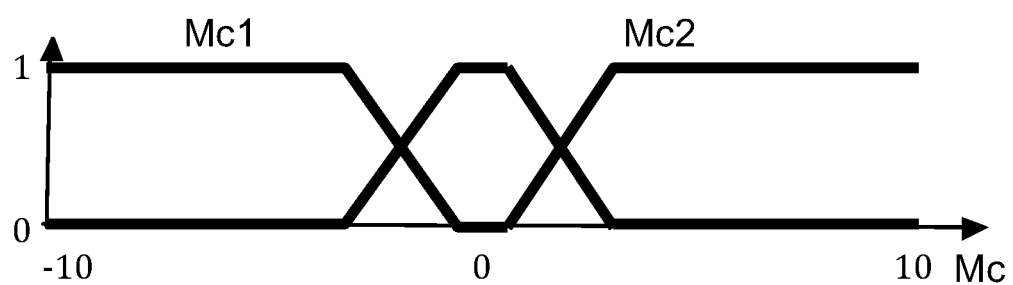
FIG. 14 is a graph illustrating the relationships between variables associated with another of the parameters used to make the decisions shown in the table in FIG. 11.

The graph shown in FIG. 14 would also be applicable (albeit with changes possibly to the actual angles at which the curves change direction), to the determination of the variables Me, Me1 and Me2, and Mf, Mf1 and Mf2, which relate to the curvature of the left lane delimiter 24a and the curvature of the right lane delimiter 24b respectively. The graph shown in FIG. 13 would be applicable (albeit with changes to the measurement denoted on the X-axis) to the determination of the variables Mg, Mg1 and Mg2 relating to whether the vehicle is closer to one side of the lane or the other. The graph shown in FIG. 14 would be applicable, (again with changes to the particular measurement denoted on the X-axis) to the determination of the variables Mh, Mh1 and Mh2, relating to the properness of the lane width. In other words, if the lane is near enough to a certain width, it is deemed proper. If the measured lane width is too small or too large, it is less proper.

Once the values of the variables Ma1, Ma2, Mb1, Mb2 . . . Mh1 and Mh2 are determined, the appropriate values can be inserted into a formula associated with each decision to determine a value of a variable associated with each decision. Thus, using this fuzzy logic, the first decision 122a would not simply yield a value of 'follow center of lane' if all the conditions are met. Instead, a formula would be applied to determine a strength value Sa for the first decision 122a. The formula is a simple multiplication of the values of each of the variables involved in decision 1. For example, from the table shown in FIG. 11, the value of Sa would be Ma1×Mb1×Mc1×Md1×Mh1. The value of Sb, which relates to the second decision 122b would be Ma2× Mb1. The value of Sc, which relates to the third decision 122c would be Ma1×Mb2. The value of Sd, which relates to the fourth decision 122d would be Ma1×Mb1×Mc1×Md2× Mh1. The other formulas can be readily determined from the table in FIG. 11.

After the values of Sa . . . Sj are determined, the controller 19 can then use them as inputs in an overall decision formula which determines which of the three possible decision outcomes to follow. The three possible decision outcomes are: 'hug the left lane delimiter', 'hug the right lane delimiter', and 'follow the center of the lane' and are themselves represented by variables LEFT, RIGHT and CENTER. A representative value is assigned to each outcome variable. In this example, a value of 0 is assigned to the variable LEFT. A value of 1 is assigned to the variable RIGHT, and a value of 0.5 is assigned to the variable CENTER. These three values can be equally spaced apart, as shown in this example, although they need not be. The values of Sa . . . Sj are then applied in a final weighted formula to determine a final decision value FDV as follows:

$$FDV = \frac{(Sa \times \text{CENTER}) + (Sb \times \text{RIGHT}) + (Sc \times \text{LEFT}) + (Sd \times \text{LEFT}) \ldots + (Sj \times \text{RIGHT})}{(Sa + Sb + Sc + Sd \ldots + Sj)}$$

The value of FDV is then compared to the three outcome values to determine a final decision. In this example, if FDV is between 0.4 and 0.6 the final decision of the controller 19 is to follow the center of the lane. If FDV is less than 0.4, the final decision of the controller 19 is to hug the left lane delimiter 24a. If FDV is more than 0.6 the final decision of the controller 19 is to hug the right lane delimiter 24b. It will be understood that these ranges can be adjusted to weight the decisions in any desired way.

Figure 12C:
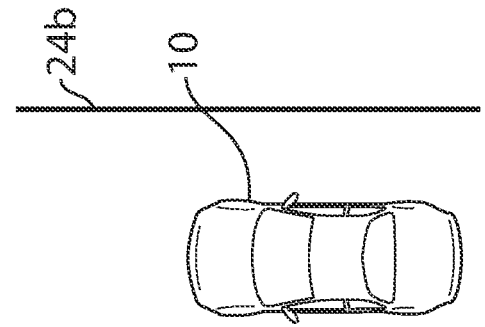
Figure 12B:
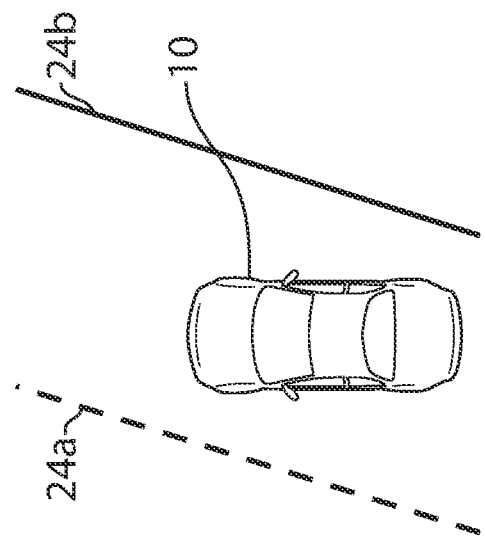
Figure 12A:
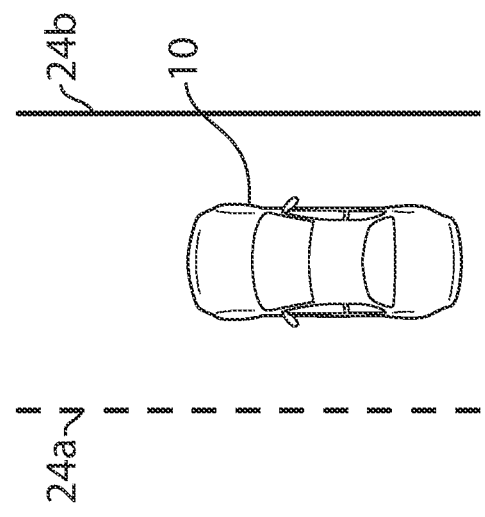

FIGS. 12a-12i illustrate examples of some of the situations listed in the table in FIG. 8. FIGS. 12a and 12b illustrate situations 120a and 120h respectively, wherein the left and right lane delimiter qualities are good. In FIG. 12a, both lane delimiters 24a and 24b are 'straight' (i.e. parallel to the vehicle 10), corresponding to situation 120a. In FIG. 12b, both lane delimiters 24a and 24b are 'not straight' (i.e. not parallel to the vehicle 10), corresponding to situation 120h. In both these cases, the output decision 122 is to set a target path 69 that is along the centerline 70 of the lane 22. FIG. 12c represents situation 120b, wherein only the right lane delimiter 24b has good quality. In this situation, the output decision 122 is to set a target path 69 that is a selected offset from the right lane delimiter 24b. The selected offset may be any selected offset, such as, for example, half of the measured lane width before to the controller 19 determined that the left lane delimiter was not of sufficient quality. In situations where the controller 19 does not determine a measured lane width for more than some period of time (such as, for example, 30 seconds), the controller 19 may use an offset that is half of a standard lane width (i.e. half of 3.6 m, which is 1.8 m). FIG. 12d represents situation 120c, wherein only the left lane delimiter 24a has good quality. In this situation, the output decision 122 is to set a target path 69 that is a selected offset from the left lane delimiter 24a. The selected offset may be determined in similar fashion to the offset determined above in relation to a good quality right lane delimiter 24b and a poor quality left lane delimiter 24a. FIG. 12e represents situation 120d, wherein both lane delimiters 24a and 24b have good quality but the right lane delimiter 24b is not parallel to the vehicle 10. FIG. 12f represents situation 120e, wherein both lane delimiters 24a and 24b have good quality but the left lane delimiter 24a is not parallel to the vehicle 10. FIG. 12g represents situation 120f, wherein both lane delimiters 24a and 24b have good quality but the lane width is outside of the proper range, and the vehicle 10 is closer to the left lane delimiter 24a. FIG. 12h represents a situation not shown in FIG. 11, but which could be an additional situation that is compared to the parameters 94. In FIG. 12h both lane delimiters 24a and 24b have good quality but the lane width is outside of the proper range, and the vehicle 10 is generally centered between the left and right lane delimiters 24a and 24b. FIG. 12i represents situation 120g, wherein both lane delimiters 24a and 24*b* have good quality but the lane width is outside of the proper range, and the vehicle 10 is closer to the right lane delimiter 24*b*.

The controller 19 continues to repeat the cycle of determining the parameters 94 and determining a final output decision as to what type of target path 69 to pursue (e.g. along the centerline 70 of the lane, or along a path that is offset from one of the lane delimiters 24*a* or 24*b*) as the vehicle 10 drives.

The lane centering system 68 may be activated via any suitable means, such as by a dashboard mounted 'on' button (not shown). The lane centering system 68 may be deactivated by the controller 19 upon a number of events. For example, if the driver 20 actuates the turn signal 61 for the vehicle 10, or if the driver 20 actuates the brakes 14, or if the controller 19 receives an indication from, for example, a controller for an adaptive cruise control system, that there is another vehicle within a selected distance in front of the vehicle 10, or if the driver applies a steering torque that is beyond a selected threshold torque, then the lane centering system 68 may be deactivated by the controller 19. Also, if the controller 19 receives an indication of an impending collision from a safety system in the vehicle 10 then the controller 19 may be programmed to deactivate the lane centering system 68. Deactivation of the lane centering system 68 as a result of any of these aforementioned events may be temporary in some instances (e.g. for a selected number of seconds), or may be permanent in some cases, such that the driver 20 is obligated to press the dashboard mounted button again in order to reactivate the system 68. Of course, the driver 20 may deactivate the system 68 by pressing an 'off' button for the system 68.

The system and controller of the present invention may utilize aspects of the vision systems and lane departure systems and/or lane change aids and/or side object detection systems of the types described in U.S. Pat. Nos. 7,914,187; 7,720,580; 7,526,103; 7,038,577; 7,004,606; 6,946,978; 6,882,287 and/or 6,396,397, which are hereby incorporated herein by reference in their entireties.

The imaging sensor or camera that captures the image data for image processing may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The camera or imaging sensor and/or the logic and control circuit of the imaging sensor may function in any known manner, such as by utilizing aspects of the vision or imaging systems described in U.S. Pat. Nos. 6,806,452; 6,690,268; 7,005,974; 7,123,168; 7,004,606; 6,946,978; 7,038,577; 6,353,392; 6,320,176; 6,313,454; 6,824,281; 5,550,677; 5,877,897; 6,498,620; 5,670,935; 5,796,094 and/or 6,396,397, and/or PCT Application No. PCT/US2010/028621, filed Mar. 25, 2010, which are all hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 7,965,336; 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; 5,530,240; 6,329,925; 7,855,755; 7,626,749; 7,581,859; 7,446,650; 7,446,924; 7,370,983; 7,338,177; 7,274,501; 7,255,451; 7,195,381; 7,184,190; 5,668,663; 5,724,187; 7,338,177; 5,910,854; 6,420,036 and/or 6,642,851, and/or European patent application, published Oct. 11, 2000 under Publication No. EP 0 1043566, and/or PCT Application No. PCT/US2011/056295, filed Oct. 14, 2011 and published Apr. 19, 2012 as International Publication No. WO 2012/051500, and/or U.S. patent applications Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, and/or U.S. provisional applications, Ser. No. 61/466,138, filed Mar. 22, 2011; Ser. No. 61/452,816, filed Mar. 15, 2011; and Ser. No. 61/426,328, filed Dec. 22, 2010, which are hereby incorporated herein by reference in their entireties. Optionally, the vision system (utilizing the rearward facing camera and other cameras disposed at the vehicle with exterior fields of view) may provide a display of a top-down view or birds-eye view of the vehicle or a surround view at the vehicle, such as by utilizing aspects of the vision systems described in PCT Application No. PCT/US10/25545, filed Feb. 26, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or U.S. provisional applications, Ser. No. 61/540,256, filed Sep. 28, 2011; Ser. No. 61/466,138, filed Mar. 22, 2011; Ser. No. 61/452,816, filed Mar. 15, 2011; and Ser. No. 61/426,328, filed Dec. 22, 2010, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A lane centering system for use in a vehicle driving in a lane on a road, the lane centering system comprising:
a camera disposed behind a windshield of a vehicle and having a field of view through the windshield and forward of the vehicle that encompasses the road ahead of the vehicle and being travelled on by the vehicle;
wherein the camera captures image data;
a controller;
wherein the controller comprises a processor that processes image data captured by the camera to detect lane delimiters on the road ahead of the vehicle;
wherein, based on processing by the processor of image data captured by the camera, the controller determines the position of a left lane delimiter on the road on a left side of the vehicle and the position of a right lane delimiter on the road on a right side of the vehicle;
wherein the controller is operable to control a steering system of the vehicle that is configured to steer the vehicle;
wherein the controller is operable to determine a target path for the vehicle based on processing by the processor of image data captured by the camera;
wherein the determined target path maintains the longitudinal centerline of the vehicle centered between the left lane delimiter and the right lane delimiter;
wherein the lane centering system is enabled responsive to at least one of (i) a user input and (ii) speed of the vehicle exceeding a threshold level; and
wherein the lane centering system is disabled when a collision avoidance system of the vehicle that determines a collision may occur has been triggered in order to permit maneuvering of the vehicle to avoid a collision without interference from the lane centering system.

2. The lane centering system of claim 1, wherein the lane centering system is automatically re-enabled a period of time after the lane centering system is disabled.

3. The lane centering system of claim 1, wherein, following disablement of the lane centering system, the lane centering system is re-enabled responsive to a user input.

4. The lane centering system of claim 1, wherein the lane centering system is disabled responsive to a user input.

5. The lane centering system of claim 1, wherein, when one of the left lane delimiter and the right lane delimiter ends while the other of the left lane delimiter and the right lane delimiter does not end, the lane centering system remains enabled for up to 3 seconds.

6. The lane centering system of claim 1, wherein the lane centering system remains enabled for up to 3 seconds when driving past an off-ramp on the road being travelled by the vehicle.

7. The lane centering system of claim 1, wherein the lane centering system is disabled when the brakes of the vehicle are applied.

8. The lane centering system of claim 1, wherein the lane centering system is disabled when a braking event of a collision mitigation system of the vehicle is taking place.

9. The lane centering system of claim 1, wherein the lane centering system of the vehicle is disabled responsive to an adaptive cruise control system of the vehicle determining that there is another vehicle within a threshold distance ahead of the vehicle.

10. The lane centering system of claim 1, wherein the controller is operable to establish a safe zone having a left safe zone delimiter based on the determined position of the left lane delimiter and a right safe zone delimiter based on the determined position of the right lane delimiter.

11. The lane centering system of claim 10, wherein the controller is operable to progressively reduce the width of the safe zone the longer that the vehicle remains within the safe zone.

12. The lane centering system of claim 1, wherein the camera comprises a component of an adaptive cruise control system of the vehicle.

13. The lane centering system of claim 1, wherein the steering system includes a steering column, and wherein a torque is supplied to the steering column based on processing by the processor of image data captured by the camera.

14. The lane centering system of claim 13, wherein the lane centering system is disabled at least in part responsive to a torque applied to the steering column by a driver of the vehicle that exceeds a threshold level.

15. The lane centering system of claim 1, wherein the controller receives an input indicative of the speed of the vehicle, and wherein the lane centering system is enabled to control steering the vehicle along the target path when the speed of the vehicle is at or above a first speed level.

16. The lane centering system of claim 15, wherein, when the lane centering system is enabled responsive to the speed of the vehicle being at or above the first speed level, the lane centering system is disabled when the speed of the vehicle falls to at or below a second speed level, and wherein the second speed level is smaller than the first speed level.

17. The lane centering system of claim 1, wherein the controller, responsive to processing by the processor of image data captured by the camera, is operable to detect Bott's dots on the road ahead of the vehicle.

18. The lane centering system of claim 1, wherein the controller, responsive to processing by the processor of image data captured by the camera, detects colored lane markings on the road ahead of the vehicle.

19. The lane centering system of claim 1, wherein the controller determines the target path based in part on whether the distance between the lane delimiters is outside of a selected range.

20. The lane centering system of claim 1, wherein the controller models detected lane delimiters as third order polynomial equations.

21. A lane centering system for use in a vehicle driving in a lane on a road, the lane centering system comprising:

a camera disposed behind a windshield of a vehicle and having a field of view through the windshield and forward of the vehicle that encompasses the road ahead of the vehicle and being travelled on by the vehicle;

wherein the camera captures image data;

a controller;

wherein the controller comprises a processor that processes image data captured by the camera to detect lane delimiters on the road ahead of the vehicle;

wherein, based on processing by the processor of image data captured by the camera, the controller determines the position of a left lane delimiter on the road on a left side of the vehicle and the position of a right lane delimiter on the road on a right side of the vehicle;

wherein the controller is operable to control a steering system of the vehicle that is configured to steer the vehicle;

wherein the controller is operable to determine a target path for the vehicle based on processing by the processor of image data captured by the camera;

wherein the determined target path maintains the longitudinal centerline of the vehicle centered between the left lane delimiter and the right lane delimiter; and wherein the lane centering system is disabled responsive to operation of an adaptive cruise control system of the vehicle.

22. The lane centering system of claim 21, wherein the controller models detected lane delimiters as third order polynomial equations.

23. The lane centering system of claim 21, wherein the controller determines the target path based in part on whether the distance between the lane delimiters is outside of a selected range.

24. A lane centering system for use in a vehicle driving in a lane on a road, the lane centering system comprising:

a camera disposed behind a windshield of a vehicle and having a field of view through the windshield and forward of the vehicle that encompasses the road ahead of the vehicle and being travelled on by the vehicle;

wherein the camera captures image data;

a controller;

wherein the controller comprises a processor that processes image data captured by the camera to detect lane delimiters on the road ahead of the vehicle;

wherein, based on processing by the processor of image data captured by the camera, the controller determines the position of a left lane delimiter on the road on a left side of the vehicle and the position of a right lane delimiter on the road on a right side of the vehicle;

wherein the controller is operable to control a steering system of the vehicle that is configured to steer the vehicle;

wherein the controller is operable to determine a target path for the vehicle based on processing by the processor of image data captured by the camera;

wherein the determined target path maintains the longitudinal centerline of the vehicle centered between the left lane delimiter and the right lane delimiter;

wherein the lane centering system is enabled responsive to at least one of (i) a user input and (ii) speed of the vehicle exceeding a threshold level; and wherein, when one of the left lane delimiter and the right lane delimiter ends while the other of the left lane delimiter and the right lane delimiter does not end, the lane centering system remains enabled for up to 3 seconds.

25. The lane centering system of claim 24, wherein the lane centering system remains enabled for up to 3 seconds when driving past an off-ramp on the road being travelled by the vehicle.

26. The lane centering system of claim 24, wherein the lane centering system is disabled when the brakes of the vehicle are applied.

* * * * *

UNITED STATES PATENT AND TRADEMARK OFFICE
CERTIFICATE OF CORRECTION

PATENT NO. : 10,427,679 B2
APPLICATION NO. : 15/700272
DATED : October 1, 2019
INVENTOR(S) : Christopher L. Van Dan Elzen et al.

It is certified that error appears in the above-identified patent and that said Letters Patent is hereby corrected as shown below:

In the Specification

Column 12
Line 28, "$Y_L = D_L X^3 + A_L X^2 + B_M X + C_I$," should be --$Y_L = D_L X^3 + A_L X^2 + B_L X + C_I$,--

Signed and Sealed this
Fifth Day of November, 2019

Andrei Iancu
*Director of the United States Patent and Trademark Office*